United States Patent [19]
Velamuri et al.

[11] Patent Number: 5,878,126
[45] Date of Patent: *Mar. 2, 1999

[54] METHOD FOR ROUTING A CALL TO A DESTINATION BASED ON RANGE IDENTIFIERS FOR GEOGRAPHIC AREA ASSIGNMENTS

[75] Inventors: Syama S. Velamuri, Dunwoody; Julia B. Torbert, Stone Mountain, both of Ga.

[73] Assignee: BellSouth Corporation, Atlanta, Ga.

[ * ] Notice: This patent issued on a continued prosecution application filed under 37 CFR 1.53(d), and is subject to the twenty year patent term provisions of 35 U.S.C. 154(a)(2).

[21] Appl. No.: 570,093

[22] Filed: Dec. 11, 1995

[51] Int. Cl.$^6$ ...................................................... H04M 3/42
[52] U.S. Cl. ........................... 379/219; 379/127; 379/220
[58] Field of Search ..................................... 379/127, 142, 379/207, 220, 211, 265, 266, 219, 230

[56] References Cited

U.S. PATENT DOCUMENTS

| | | | |
|---|---|---|---|
| 3,556,530 | 1/1971 | Barr et al. ................................. | 273/139 |
| 3,614,328 | 10/1971 | McNaughton et al. ..................... | 379/88 |
| 3,928,724 | 12/1975 | Byram et al. ............................... | 379/89 |
| 4,139,739 | 2/1979 | von Meister et al. ..................... | 379/207 |
| 4,164,025 | 8/1979 | Dubnowski et al. ..................... | 364/900 |
| 4,178,476 | 12/1979 | Frost ........................................... | 379/59 |
| 4,191,860 | 3/1980 | Weber ......................................... | 379/115 |
| 4,310,727 | 1/1982 | Lawser ....................................... | 379/207 |
| 4,313,035 | 1/1982 | Jordan et al. .............................. | 379/207 |
| 4,341,929 | 7/1982 | Alexander et al. ........................ | 379/216 |
| 4,577,062 | 3/1986 | Hilleary et al. ............................ | 379/88 |
| 4,608,460 | 8/1986 | Carter et al. ............................... | 379/201 |
| 4,737,983 | 4/1988 | Frauenthal et al. ....................... | 379/221 |
| 4,757,267 | 7/1988 | Riskin ........................................ | 379/113 |
| 4,797,818 | 1/1989 | Cotter ......................................... | 364/401 |
| 4,924,510 | 5/1990 | Le .............................................. | 379/221 |
| 5,046,088 | 9/1991 | Margulies ................................... | 379/211 |
| 5,095,505 | 3/1992 | Finucane et al. ......................... | 379/201 |
| 5,136,636 | 8/1992 | Wegrzynowicz .......................... | 379/207 |
| 5,168,515 | 12/1992 | Gechter et al. ........................... | 379/265 |
| 5,214,688 | 5/1993 | Szlam et al. .............................. | 379/67 |
| 5,253,288 | 10/1993 | Frey et al. ................................. | 379/221 |
| 5,259,023 | 11/1993 | Katz ........................................... | 379/88 |
| 5,506,897 | 4/1996 | Moore et al. .............................. | 379/220 |
| 5,588,048 | 12/1996 | Neville ....................................... | 379/220 |

OTHER PUBLICATIONS

"Telecommunications Alert" Newsletter, Entitled AT&T, Domino's Pizza Test Automatic Store Locator Service vol. 9, No. 10, Oct. 1991.

*Primary Examiner*—Ahmad F. Matar
*Attorney, Agent, or Firm*—Jones & Askew

[57] ABSTRACT

A method and system of routing a call, made to a single number of a subscriber, to a particular subscriber location of a plurality of subscriber locations based on the geographic area from which the call originated is disclosed. One method of the present invention routes a call from a caller that is placed by dialing a single telephone number that is operative for serving all of the subscriber locations. The method includes identifying the calling party with a specific location identifier indicating the location of the calling party, providing a range table of selected ranges of location identifiers and if the specific location identifier is within one of the selected ranges of the range table, the call is routed to the destination location corresponding to the selected range containing the specific location identifier. If the specific location identifier is not located within one of the selected ranges, the call is routed to the destination location corresponding to the specific location identifier located in an auxiliary database containing subscriber locations. In the disclosed embodiment, the geographic areas are represented by zip codes and multiple categories of zip codes may be represented.

24 Claims, 18 Drawing Sheets

QUERY PROCESSING IN SCP

QUERY PROCESSING IN SCP

QUERY PROCESSING IN SCP

SUBSCRIBER LOCATION DESIGNATIONS
ZIP CODE RANGE TABLES
CLEANING SERVICE S3: TELEPHONE #404-444-6363,
SUBSCRIBER ID=1018

| RANGE TABLE 9: SUB. ID=1018 | | | |
|---|---|---|---|
| INDEX | 5-DIGIT RANGES | | SUB. SITE ID |
| | BEGINNING | END | |
| 30300 | 30372 | 30374 | S3Y |
| 30301 | 30375 | 30376 | S3X |
| 30302 | 30379 | 30379 | S3Z |

| RANGE TABLE 9: SUB. ID=1018 | | | |
|---|---|---|---|
| INDEX | 7-DIGIT RANGES | | SUB. SITE ID |
| | BEGINNING | END | |
| 3037700 | 3037710 | 3037725 | S3X |
| 3037701 | 3037735 | 3037776 | S3Z |
| 3037800 | 3037800 | 3037830 | S3Z |

| RANGE TABLE 9: SUB. ID=1018 | | | |
|---|---|---|---|
| INDEX | 9-DIGIT RANGES | | SUB. SITE ID |
| | BEGINNING | END | |
| 303772600 | 303772615 | 303772699 | S3Y |
| 303777700 | 303777742 | 303777799 | S3Z |

FIG. 9B

SUBSCRIBER LOCATION DESIGNATIONS
ZIP CODE RANGE TABLES

CLEANING SERVICE S3: TELEPHONE #404-444-6363,
SUBSCRIBER ID=1018

| INDEX | 5,7 AND 9-DIGIT RANGES | | SUB. SITE ID |
|---|---|---|---|
| | BEGINNING | END | |
| 303009999 | 30372 | 30374 | S3Y |
| 303019999 | 30375 | 30376 | S3X |
| 303029999 | 30379 | 30379 | S3Z |
| 303770099 | 3037710 | 3037725 | S3X |
| 303770199 | 3037735 | 3037776 | S3Z |
| 303780099 | 3037800 | 3037830 | S3Z |
| 303772600 | 303772615 | 303772699 | S3Y |
| 303777700 | 303777742 | 303777799 | S3Z |

RANGE TABLE 10: SUB. ID=1018

FIG. 10

SUBSCRIBER LOCATION DESIGNATIONS
ZIP CODE RANGE TABLES

CLEANING SERVICE S3: TELEPHONE #404-444-6363,
SUBSCRIBER ID=1018

| RANGE TABLE 11A: SUB. ID=1018 | | | |
|---|---|---|---|
| INDEX | 5-DIGIT RANGES | | SUB. SITE ID |
| | BEGINNING | END | |
| 30372 | 30372 | 30372 | S3Y |
| 30373 | 30373 | 30373 | S3Y |
| 30374 | 30374 | 30374 | S3Y |
| 30375 | 30375 | 30375 | S3X |
| 30376 | 30376 | 30376 | S3X |
| 30379 | 30379 | 30379 | S3Z |

| RANGE TABLE 11B: SUB. ID=1018 | | | |
|---|---|---|---|
| INDEX | 7-DIGIT RANGES | | SUB. SITE ID |
| | BEGINNING | END | |
| 3037710 | 3037710 | 3037719 | S3X |
| 3037720 | 3037720 | 3037725 | S3X |
| 3037730 | 3037735 | 3037739 | S3Z |
| 3037740 | 3037740 | 3037749 | S3Z |
| 3037750 | 3037750 | 3037759 | S3Z |
| 3037760 | 3037760 | 3037769 | S3Z |
| 3037770 | 3037770 | 3037776 | S3Z |
| 3037800 | 3037800 | 3037809 | S3Z |
| 3037810 | 3037810 | 3037819 | S3Z |
| 3037820 | 3037820 | 3037829 | S3Z |
| 3037830 | 3037830 | 3037839 | S3Z |

| RANGE TABLE 11C: SUB. ID=1018 | | | |
|---|---|---|---|
| INDEX | 9-DIGIT RANGES | | SUB. SITE ID |
| | BEGINNING | END | |
| 303772600 | 303772615 | 303772699 | S3Y |
| 303777700 | 303777742 | 303777799 | S3Z |

*FIG. 11*

METHOD FOR ROUTING A CALL TO A DESTINATION BASED ON RANGE IDENTIFIERS FOR GEOGRAPHIC AREA ASSIGNMENTS

FIELD OF THE INVENTION

The present invention relates to the field of switched telephony and in particular to a method of routing a call corresponding to a dedicated number of a subscriber to a particular subscriber location among a plurality of subscriber locations based on the geographic location of the caller.

BACKGROUND OF THE INVENTION

An entity, such as a business or government agency, will often have multiple locations to serve a large area. The multiple locations generally are scattered throughout various regions of the area of service, so that customers may conveniently seek the service within the customer's geographic area. Also, when the service is to provide service or to deliver and/or pick up goods at the customer's location, the entity may minimize response time if the entity has a location within a customer's geographic area. For example, this is especially true for a franchised pizza delivery business or emergency agencies such as fire and ambulance services.

While it is convenient and efficient for an entity to have multiple locations in various regions of the entity's area of service, it is likewise convenient and efficient for the entity to have a single advertised directory number that is applicable to all of the multiple entity locations within the entity's area of service. Having a single advertised number for an entity helps to eliminate the expenses which would otherwise be associated with advertising the different locations individually with a different phone number for each of the locations. Additionally, advertising a single number can make it easier for a caller to remember the service provider's phone number.

Solutions to this problem have been addressed whereby businesses obtain an 800 telephone number which is used as the single business number and callers of the 800 telephone number are routed to a dealer based upon the NPA-NXX of the calling party's number, NPA-NXX-XXXX, (where NPA is the calling party's area code, NXX is the central office code and XXXX identifies a particular station in the central office code). U.S. Pat. No. 4,757,267 to Riskin discloses a system in which a call is routed to a nearby dealer based upon the coordinates of the central office (NPA-NXX) serving the dealer. The system first receives a call from a caller then outdials to a dealer, and crossconnects the incoming call to the outgoing call if the dealer is available. The system monitors both lines during this process. This process can be both inefficient and uneconomical.

U.S. Pat. No. 5,136,636 to Wegrzynowicz discloses a method of routing a call in which a primary database is accessed using the caller's NPA and 800 directory number to provide an access key which identifies the customer. Wegrzynowicz generally relates to a method for selecting a local dealer out of a large group of dealers for completion of an 800 number. The caller is first connected to a toll switching system which sends a query to a first database using the 800 number and the caller's numbering plan area (NPA) code. The first database responds with a routing number which is used to select one of a plurality of second databases for serving one customer. After selecting one of the plurality of databases, the routing number and caller's NPA plus office code (NXX) are used to access the second database and to obtain the telephone number of a local dealer. The telephone number is returned to the toll system for completing the call. Therefore, Wpgrzynowicz solves the problem of handling large amounts of data by providing multiple data bases for serving each customer. If one customer of Wegrzynowicz serves more than one area code (NPA) area then multiple databases must be created.

While each of these patents disclose a method of routing a call to a business location based on the caller's NPA-NXX, neither discloses a method for accomplishing routing on a sufficiently granular basis when a business has multiple locations within the area (NXX) served by a central office. With NPA-NXX routing, a multiple location business within an area served by an NPA-NXX (central office) is not sufficiently able to distinguish and therefore route calls to the most appropriate location.

Many current mechanisms and databases used to process calls are limited. For example, AT&T provides an advanced intelligent network platform with databases and mechanisms for storing and accessing data. With the AT&T network platform, telephone companies may develop service package applications with recent/change and decision graph mechanisms which store subscription data that is pertinent to multiple subscribers for specific services. With recent/change and decision graph mechanisms, multiple parameters or fields of information may be evaluated to determine how a call should be handled or to which subscriber the call should be directed. The recent change and decision graph data is stored in memory, thus this data can be accessed at memory speed. However, AT&T's A-I-Net platform imposes significant limitations on the amount of data that can be stored in recent/change and decision graphs.

By contrast, commercial relational databases such as ORACLE, SYBASE, and INFORMIX allow storage for large amounts of data. Relational databases, in general, are very flexible. The basic data structure in a relational database is a "relation or table." These databases allow multiple fields of input to be used as a key to retrieve the related attributes. However these databases also have a drawback, i.e., they do not support high transaction throughputs to allow efficient call processing.

The AT&T A-I-Net platform provides a mechanism to store large quantities of data in real-time databases. The data contained within these databases may be accessed during real-time processing. Real-time databases offer high transaction throughput to facilitate real-time call processing. Even higher transaction throughputs are possible by utilizing cacheing mechanisms. Cacheing mechanisms allow the whole/or part of a specific real-time database to be stored in memory for faster access. AT&T's A-I-Net platform allows such a feature to be used in conjunction with the real-time databases. The real-time databases currently available on A-I-Net platform may be accessed with only a single key which is usually a directory number (DN) to query the database to obtain the relevant data (i.e., one field of information is input to obtain single/multiple fields(s)). Thus, a separate database would normally be constructed or maintained for each subscriber to the service. Providing a separate database for translating the geographic area information for each subscriber can be costly.

In summary of the data handling devices, the recent change and decision graph mechanisms can support and exceed the throughput requirements, but cannot handle large amounts of data. Relational databases allow storage of large amounts of data but cannot meet throughput requirements.

Real-time databases can store large amounts of data, can meet throughput requirements but are constrained in that they only support a single field of input as a key.

Thus, there is a need in the art for a call routing system that provides flexible routing options operative to route calls when a large quantity of relational data is used and to minimize the amount of data accessed and stored to yield a call routing determination.

SUMMARY OF THE INVENTION

Generally described, the present invention provides a method of routing a call, made to a single number of a subscriber, to a particular subscriber location from among a plurality of subscriber locations based on the geographic area from which the call originated.

One method of the present invention routes a call from a caller that is placed by dialing a single telephone number that is operative for serving all of the subscriber locations. The method includes identifying the calling party with a specific location identifier indicating the location of the calling party, providing a range table of selected ranges of location identifiers, each selected range having a beginning and an end location identifier and each range corresponding to a call destination location, and if the specific location identifier is located in one of the selected ranges of the range table, the call is routed to the destination location corresponding to the selected range containing the specific location identifier. If the specific location identifier is not located in one of the selected ranges of the range table, the call is routed to the destination location corresponding to the specific location identifier located in an auxiliary database containing subscriber locations. In the disclosed embodiment, the geographic areas are represented by zip codes.

Also, a disclosed embodiment of the present invention may determine the specific geographic area from which the specific call originated, access a table containing identifiers that indicate a plurality of categories of geographic areas from which calls may originate, identify the category from the table containing the specific geographic area, and provide call routing instructions for a particular subscriber location corresponding to the category of the specific geographic area. In the disclosed embodiment, the geographic areas comprise zip code areas. Also, the categories may indicate the granularity of a zip code representing the zip code area. The categories may include 5-digit, 7-digit, or 9-digit zip code areas.

Thus, it is an object of the present invention to provide a method of storing and accessing a large quantity of call routing data in order to complete a telephone call.

It is another object of the present invention to provide a method of storing data related to multiple subscribers in a single database and accessing that data to obtain call routing information.

It is another object of the present invention to provide a method of routing a call corresponding to a dedicated number of a subscriber to a particular subscriber location of a plurality of subscriber locations based on the geographic location of the caller.

It is another object of the present invention to provide call routing based on the zip code area from which the call originated.

It is another object of the present invention to minimize the storage space associated with routing calls based on the geographic area from which calls originate.

It is another object of the present invention to minimize the number of queries to databases in order to obtain call routing instructions.

It is another object of the present invention to provide call routing instructions based on different categories of areas from which calls may originate.

These and other objects, features, and advantages of the present invention will become apparent from reading the following description in conjunction with the accompanying drawings.

BRIEF DESCRIPTION OF THE DRAWINGS

FIG. 9B shows call routing tables corresponding to ranges used for the call routing assignments represented in FIG. 9A.

FIG. 10 shows a single alternative call routing table corresponding to ranges used for the call routing assignments represented in FIG. 9A.

FIG. 11 shows another embodiment of call routing tables corresponding to ranges used for the call routing assignments represented in FIG. 9A.

DETAILED DESCRIPTION

Figure 1A:
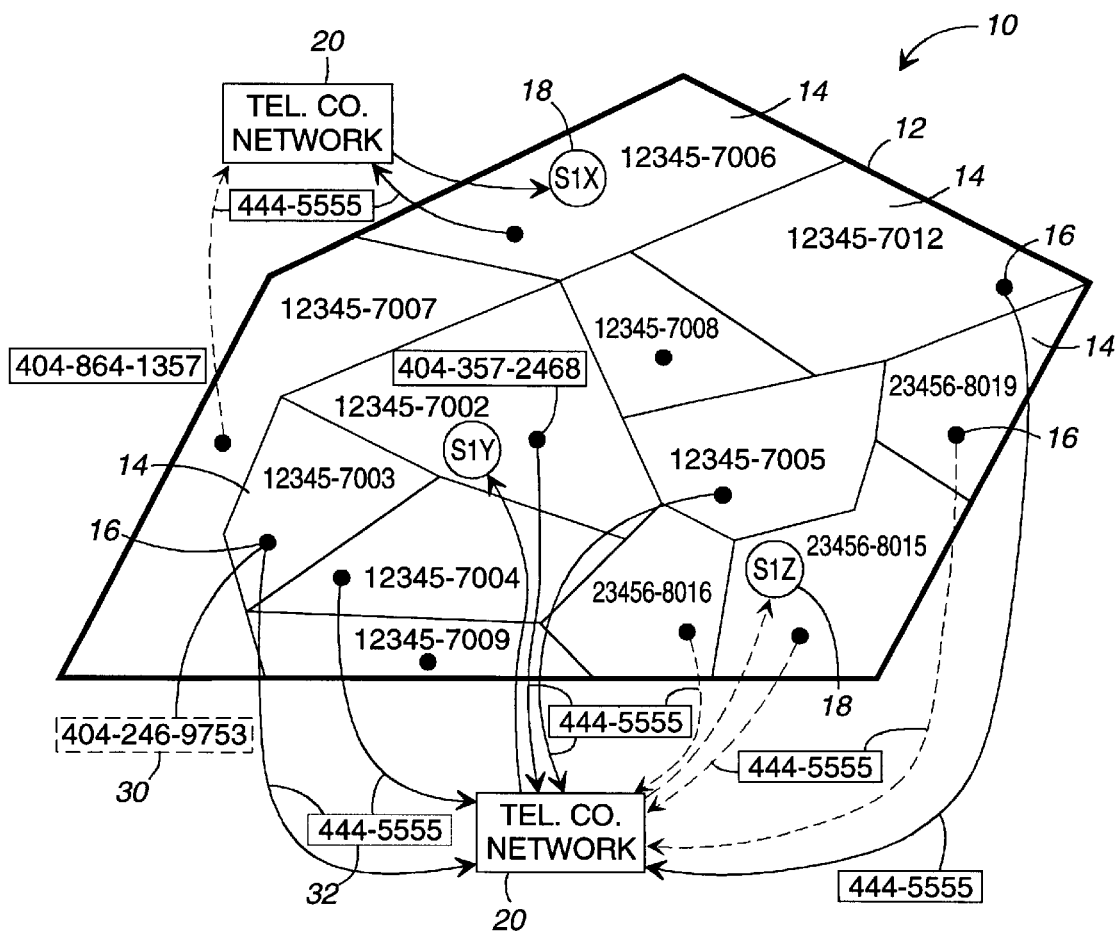
FIGS. 1A and 1B are general representations of the call area serviced by the geographic call routing system of the present invention.
Figure 1B:
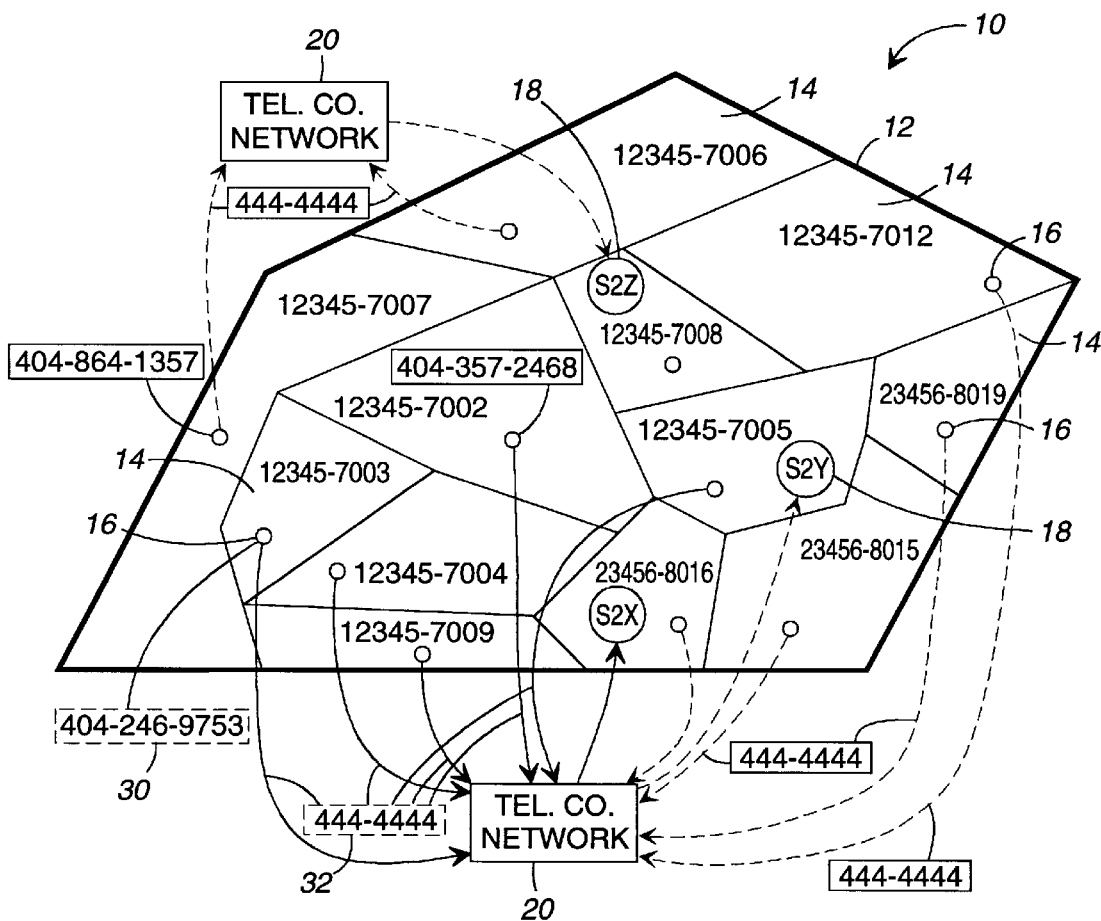

Turning now to the drawing figures in which like numbers reference like parts or steps, embodiments of the present invention will now be described. As generally shown in FIGS. 1A and 1B, the present invention is preferably implemented over a specified area serviced by a telephone company. The present invention contemplates, but it is not limited to, the various embodiments disclosed herein.

Figure 2:
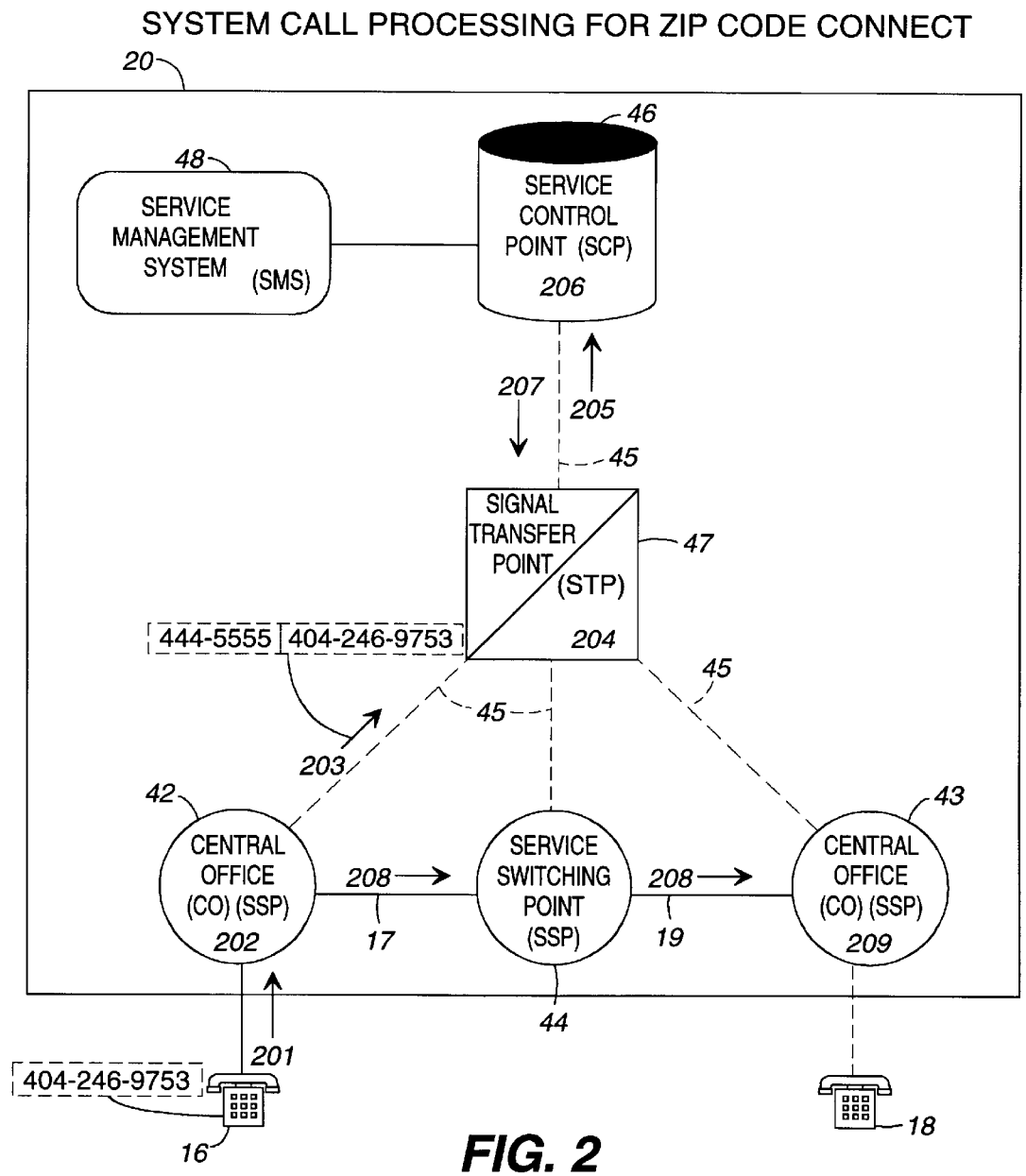
FIG. 2 shows the preferred embodiment of the general switching system of a telephone company and the call processing steps implemented with the present invention.

As noted above, the present invention generally provides a method of routing a call, made to a single number of a subscriber, to a particular subscriber location of a plurality of subscriber locations based on the geographic area from which the call originated. Preferably, the geographic area is a nine-digit zip code area. The zip code routing system is preferably implemented in a modern public, switched advanced intelligent telephone network as shown in FIG. 2.

As shown in FIGS. 1A and 1B, the preferred embodiment of the present invention provides a method that enables an entity with multiple locations within a telephone network LATA (local access transport area) to utilize a single number for its service. All callers within the area dial the same number to reach the subscriber's business, and a telephone network routes the calls to the most appropriate subscriber location based on the geographic location of the caller. The geographic location of the caller is determined using a database that has the calling party's number (NPA-NXX-XXXX) assigned to a zip code area. When a subscriber desires to have zip code routing implemented, the subscriber will assign the zip codes within the service area to the particular subscriber locations that should serve callers from the selected zip code areas.

An advantage of the present invention is the ability to route calls based on a large quantity of geographic data. The large quantity of geographic data may be obtained by dividing an area into many small areas. By utilizing small areas to define routing, an entity or subscriber is given a greater degree of flexibility in defining service for its customers. It should be appreciated that the method and system described herein may be used to provide routing based on geographic areas larger or smaller than the areas provided by nine-digit zip codes as specifically described.

With continuing reference to FIG. 1A, the general operation of the present invention will be described. In FIG. 1A, a general representation of the geographic call routing system 10 is shown as implemented with a specific subscriber, Pizza Place. The geographic call routing system 10 is preferably implemented in a particular area of service 12. Preferably, the area of service 12 represents a local access transport area (LATA) and is represented by the pentagon shaped figure shown encompassing the smaller zip code areas 14. It should be appreciated that many more zip code areas are represented within a LATA than the number of zip code areas 14 shown in FIG. 1. It should also be appreciated that the zip code areas 14 may be defined as any other delineated geographic areas or places.

In FIG. 1A, the zip codes are shown as nine-digit zip codes. A zip code is a numeric code that identifies areas within the United States and its territories to simplify the distribution of mail by the U.S. Postal Service. The first digit of a zip code divides the country into ten large groups of states, numbered from zero in the northeast to nine in the far west. The first three digits represent a sectional center, the fourth and fifth digits represent a delivery area, the sixth and seventh digits represent a geographic sector, and eighth and ninth digits represent a sector segment. Those skilled in the art should note that eleven-digit zip code (5-digit zip code+ 4+2 digits) and various multiple-digit code routing processes are possible by implementations of the methods of the present invention described herein. In an eleven-digit zip code, the last two digits essentially identify a house or an apartment.

A plurality of calling parties 16 are located within the zip code areas 14 as shown. Each zip code area 14 is likely to contain at least one calling party 16. Also, shown within certain zip code areas are particular subscriber locations 18, S1X, S1Y, and S1Z. It should be appreciated that the subscriber locations shown in FIG. 1A are given only as examples and that the number of subscriber locations serviced by the present invention may vary. Unlike calling parties 16, subscriber locations 18 are not likely to be found in each zip code area 14. Thus, a subscriber decides which zip code areas 14 are best served by the subscriber's particular location 18. Once a subscriber has determined which zip code areas are best served by the subscriber locations 18, the subscriber submits those assignments of zip codes to a telephone company for implementing in the telephone company's network 20. Upon receiving the subscriber routing designations, the telephone company may utilize the system of the present invention to implement automatic call routing based upon the geographic zip code area assignments.

As noted above, a subscriber utilizes one telephone number to service all the customers within a specified area of service 12. When a calling party 16 dials the single number of a subscriber, the telephone company 20 receives the dialed number along with the calling party number then translates the calling party number into a zip code from which the call originated. With this translation of calling party number to zip code area 14, the telephone company may automatically route the telephone call to the designated or selected subscriber location 18. For example, as shown in FIG. 1A, a calling party 16 represented by the calling party number 30, shown as 404-246-9753, dials for example the subscriber Pizza Place which has a dialed number 32, shown as 444-5555 and a subscriber ID 1001, as explained below. The telephone company 20 recognizes the dialed number 32 as a number designated for the zip code routing service. The telephone company then translates the telephone number 30 into the appropriate zip code, 12345-7003. The telephone company 20 then accesses the appropriate assignments designated by the Pizza Place and determines that the location S1Y is designated to receive calls from the zip code area 12345-7003. After making this determination, the call from the calling party number 30 is routed to Pizza Place location S1Y.

It should also be noted that the calling parties 16 located in zip code areas 12345-7002, 12345-7004, 12345-7005, and 12345-7012 are all routed to Pizza Place location S1Y, as indicated by the solid arrow lines directed to telephone company 20 and the solid arrow line directed from telephone company 20 to Pizza Place location S1Y. Similarly, calling parties 16 located in zip code areas 23456-8016, 23456-8015, and 23456-8019 are all routed to the Pizza Place location S1Z as indicated by the dashed arrow lines directed to the telephone company 20 and the dashed arrow line directed from the telephone company network 20 to Pizza Place location S1Z. Also shown in the upper left portion of FIG. 1A are calling parties 16, located within the zip code areas 12345-7007 and 12345-7006 which are routed to the telephone company 20 then to Pizza Place location S1X. Additionally, as shown in FIG. 1A, a subscriber may not assign or serve all zip code areas within a designated area of service 12 as indicated by the unassigned zip code areas 12345-7009 and 12345-7008. Also, if a calling party number is translated into a zip code but no subscriber location is assigned to this area, then the call may be routed to a default store location based on other criteria such as the NPA-NXX area of the calling party. Alternatively, the call corresponding to the unassigned area may be terminated with a recorded message. Thus, a subscriber has a great deal of flexibility in deciding how calling parties 16 or zip code areas 14 will be routed within a designated area of service 12.

As noted above, the present invention is preferably implemented in a modern public, switched telephone network commonly referred to as an Advanced Intelligent Network (AIN). Most of the intelligence of the network resides in the components shown in FIG. 2. The present invention contemplates, but it is not limited to, the various embodiments disclosed herein.

Referring to FIG. 1B, a general representation of the geographic call routing system 10 is shown as implemented with a specific subscriber, Pizza House. It should be noted that the same notations as used in the discussion of FIG. 1A are used in conjunction with FIG. 1B. Note that although the area of service 12 and the calling parties 16 are the same for Pizza Place as shown in FIG. 1A and Pizza House as shown in FIG. 1B, the locations of the specific subscriber locations are different as well as the call routing assignments as shown by the solid and dashed arrow lines. Thus, multiple subscribers may make independent assignments of zip code areas 14 according to the subscribers' selections. Pizza House has a single telephone number 444-4444 and a subscriber ID 1002, as explained below.

Referring to FIG. 2, the preferred embodiment of the general switching system network of the telephone company 20 and the call processing steps implemented with the present invention are shown. The general operation of the switching system will be described in connection with FIG. 2. FIG. 2 shows a block diagram of the AIN telephone network used in implementing the preferred embodiment for Zip Code Routing (ZCR) in accordance with the present invention. A telephone of a calling party 16 is connected to the caller's central office (CO) 42 which is a service switching point (SSP). A ZCR subscriber location 18 is connected to a central office (CO) 43 which is likewise a service switching point (SSP). The service switching points SSPs 42, 44 and 43 are connected by Signaling System 7 (SS7) data links 45 to a service control point (SCP) 46. A signal transfer point (STP) 47 may be provided between the service switching points (SSPs) 42, 44 and 43 and service control point (SCP) 46 along the SS7 data links 45 to route call processing queries between the service switching points (SSPs) 42, 44, and 43 and the service control point (SCP) 46. In setting up a call from a calling party 16 to subscriber location 18, the caller's central office (CO) 42 communicates with a service switching point (SSP) 44 and central office 43 via digital data communication channel 45. Once the call is routed, a communication path is set up between the call and subscriber location along paths 17 and 19.

Currently, these data links 45 are bi-directional data links employing a signaling protocol referred to as SS7. The SS7 protocol is well known to those skilled in the art and is described in a specification promulgated by the American National Standards Institute (ANSI). The SS7 protocol is a layered protocol wherein each layer provides services for layers above it and relies on the layers below to provide it with services. The protocol employs data packets that have a signal information field that includes a variable length user specific data and a routing label. A service information octet is included in the data packets and identifies a priority of the message, the national network of the destination of the message, and the user name identifying the entity that created the message. Also, certain control and sequence numbers are included within the data packets, the uses and designations of which are known to those skilled in the art and described in the above referenced ANSI specification.

All of the SS7 data packets from the switches (such as 44) pass through at least one signal transfer point (STP) 47. Those skilled in the art will recognize that signal transfer point 47 is simply a multi-port high speed data packet switch that is programmed to respond to the routing information in the appropriate layer of the SS7 protocol, and route the data packet to its intended destination. The signal transfer point is not normally, per se, the final destination of a data packet, but merely directs traffic among the other entities on the network that generate and respond to the data packets.

It should be noted that signal transfer point devices such as signal transfer point (STP) 47 are conventionally installed in redundant pairs within the network so that if one device fails, its mate takes over until the first signal transfer point (STP) 47 is able to return to service.

Much of the intelligence, and the basis for many of the features of the network, resides in the local service control point (SCP) 46 that is connected to signal transfer point (STP) 47 via SS7 data link 45. As is known to those skilled in the art, service control points are typically implemented by relatively powerful fault tolerant computers. Typical implementation devices include the Star Server FT Model 3200 or the Star Server FT Model 3300, both sold by American Telephone & Telegraph Company. The architectures of these computers are based on Tandem Integrity S2 and Integrity S1 platforms, respectively. In most implementations of a public switched telephone network, service control points may be also provided in redundant mated pairs in order to assure reliability and continued operation of the network. It should be appreciated that other processors may be used with the present invention.

The computing devices implementing service control point (SCP) 46 typically accommodate one to twenty-seven disk drives ranging from 300 megabytes to 1.2 gigabytes per drive, and have main memory on the order of 24 to 192 megabytes. The computers embodying the service control point (SCP) 46 can execute at a speed on the order of 17 million instructions per second. Using the SS7 protocol, this translates to about 50 to 100 transactions (query/response pairs) of network messages per second.

The service control point (SCP) 46 includes databases that identify particular service subscribers. In order to keep the processing of data and calls as simple and generic as possible at switches, such as service switching point (SSP) 42, a relatively small set of triggers are defined at the SSP at particular points in call processing. A trigger in the service switching point (SSP) 42 is an event encountered at some point in call processing that causes the SSP 42 to suspend call processing and generate a data packet to be sent to a service control point. The trigger causes the service control point (SCP) 46 to query its data base to determine the customized calling feature to be provided. The results of the data base inquiry are sent back to the SSP 42 from SCP 46 through service transfer point STP 47. The return data packet includes instructions to the service switching point as to how to process the call. The instruction may be to take some special action as a result of a customized calling service.

The service control point (SCP) 46 is the host for the feature logic, service data, and subscription data. A service management system (SMS) 48 is interfaced with the SCP 46 to provide data to the SCP 46 for carrying out the functions of the zip code routing system. Using the subscription data in conjunction with the zip code routing feature logic, discussed below, allows the SCP 46 to provide customized zip code routing for a particular subscriber.

The service control point (SCP) 46 translates the calling party number (CgPN) by means of a geographic code (geocode) database to a zip code associated with the calling party number (CgPN). The subscriber specified assignments for the zip code routing system are provisioned and integrated into the system by the SMS. The subscriber assignments and related data are input at the SMS and sent to the SCP 46 which uses them to determine the routing for zip code routing calls. Programming tools, known to those skilled in the art, are available which may be used to implement the various embodiments of the present invention. For example, service logic language available from AT&T may be used.

A subscriber, with multiple subscriber locations 18, is assigned a directory number by the telephone service provider to serve as the zip code routing number. The zip code routing number may have a dedicated NXX segment. A dedicated NXX connotes a three digit number dedicated for use with zip code routing, for example, NPA-444-55550where "444" is the dedicated NXX three digit number. Referring to step 201 of FIG. 2, a calling party 16 dials the zip code routing number for service from the Pizza Place subscriber that has a location 18. At step 202, the service switching point (SSP) serving the caller (assuming the caller's CO 42 is an SSP equipped office) recognizes the dedicated NXX of the zip code routing number, 444-5555 for the subscriber as a trigger and suspends call processing. (If the caller's CO 42 did not have SSP capabilities, then it would be set up to recognize the dedicated NXX and route the call to an SSP.) A transactions capabilities application part (TCAP) query, which is a data packet that contains the calling party number 404-246-9753 and the dialed number 444-5555 along with other call routing information, is formulated by the SSP 42 and launched onto the SS7 signaling network 45 at step 203. At step 204, when the TCAP query arrives at the STP 47, the content of the data packet at the protocol level applicable to the STP 47 is examined. At step 205, the TCAP query is then routed from the STP 47 to the SCP 46 where the zip code routing feature logic and the subscriber's data reside.

The service control point SCP 46 determines the routing number (the telephone number of subscriber location 18) for the appropriate subscriber location based on the routing information specified in the Pizza Place subscriber's data at step 206. At the SCP 46, databases are provided that are used to determine the area from which the call originated and the subscriber location to which the call should be directed. The databases, as discussed below, may contain geographic routing data as well as other subscriber specified parameters. After determining the appropriate subscriber location that should receive the call, such as subscriber location 18, at step 207, the service control point (SCP) 46 sends a TCAP response message back to the service switching point (SSP) 42 that originated the query containing instructions for routing the call to the appropriate subscriber location. At steps 208 and 209, the SSP 42 routes the call to SSP 44 to central office 43 and then to the subscriber location 18 based on the routing number (telephone number for location 18) returned in the SCP's response message.

In implementing the present invention, the service control point (SCP) 46 can be set up to accept more than one 10-digit directory number (DN) as the service key for a particular set of subscription data. The service key corresponds to the zip code routing number dialed (for example NXX-XXXX, where a certain NXX is dedicated to the zip code routing system) and is used to access subscription data for zip code routing. Because a single local access transport area (LATA) can encompass more than one NPA (area code), the SCP 46 should be prepared to receive different NPAs in association with the NXX-XXXX number in the service key. For example, the Pizza Place may operate in LATA that expands over two area codes, 404 and 770, and thus the dialed number transmitted may be 404-444-5555 or 770-444-5555 depending on the area code.

Thus, the SCP 46 must translate the area code to a LATA identification (ID) to be used with the dedicated NXX-XXXX number in the service key to determine the subscription data that is applicable. By setting up subscriptions on a LATA basis and using the three digit LATA identification (ID) along with the dedicated NXX as the service key to access subscriber data, the NPA of the called party number becomes irrelevant. As a result, when a LATA encompasses more than one NPA (area code) and when a dedicated NXX number is used, two service keys do not have to be assigned to a subscription identifier as would be required if the service key used the NPA in combination with the dedicated NXX as the service key.

The call processing on SCP 46 is implemented by two finite state machines. The first finite state machine receives the incoming TCAP query, and derives a subscription identifier from the LATA identification (ID) and the service key. The first finite state machine sends the subscription identifier to the second finite state machine to be used as a "pointer" to the appropriate subscriber data set for the LATA which matches the LATA of the caller. The second finite state machine processes queries and performs the main zip code routing logic.

As noted above, mechanisms and databases used to process calls are limited. The AT&T network platform provides a service package application with recent/change and decision graph mechanisms which store subscription data that is pertinent to multiple subscribers. With recent/change and decision graph mechanisms, multiple parameters or fields of information may be evaluated to determine how a call should be handled or to which subscriber the call should be directed. However, there are significant limitations with respect to the quantity of data that can be stored in SPA recent/change and decision graphs. These mechanisms do not permit large quantities of subscriber data to be stored. Also, the AT&T advanced intelligent network platform provides a mechanism to store a large quantity of data in real-time databases. The data contained within these databases may be accessed during real-time call processing. The real-time databases may be accessed with only a single key, which may be a directory number (DN), to query the database to obtain the relevant data (i.e., one field of information is input to obtain the output information). Thus, recent/change and decision graph mechanisms do not accommodate large quantities of data and real-time databases do not facilitate storage of different sets of data pertinent to multiple subscribers that is generally accessed by a single directory number.

Figure 3:
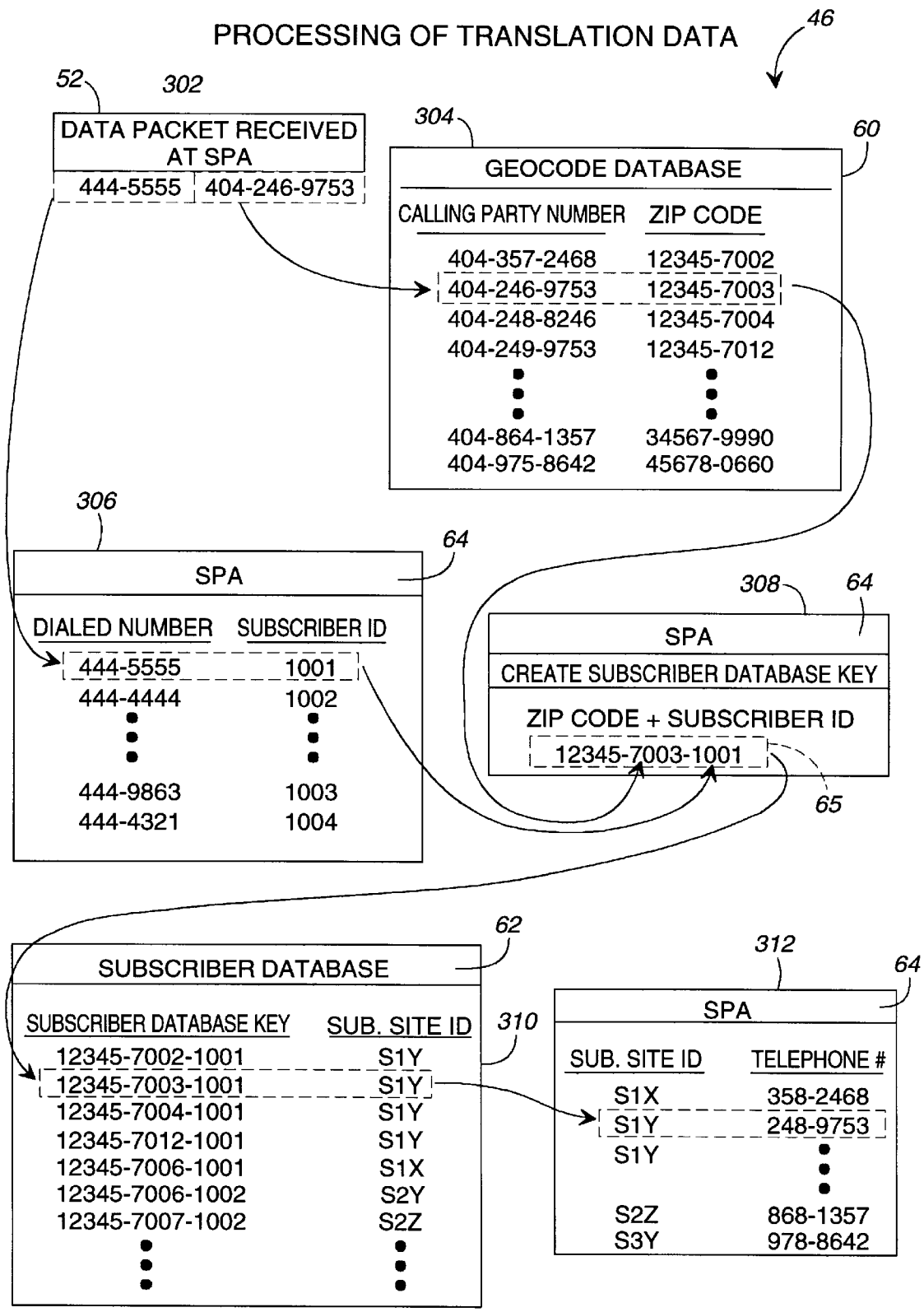
FIG. 3 shows the order of processing translation data in an embodiment of the present invention.
Figure 4:
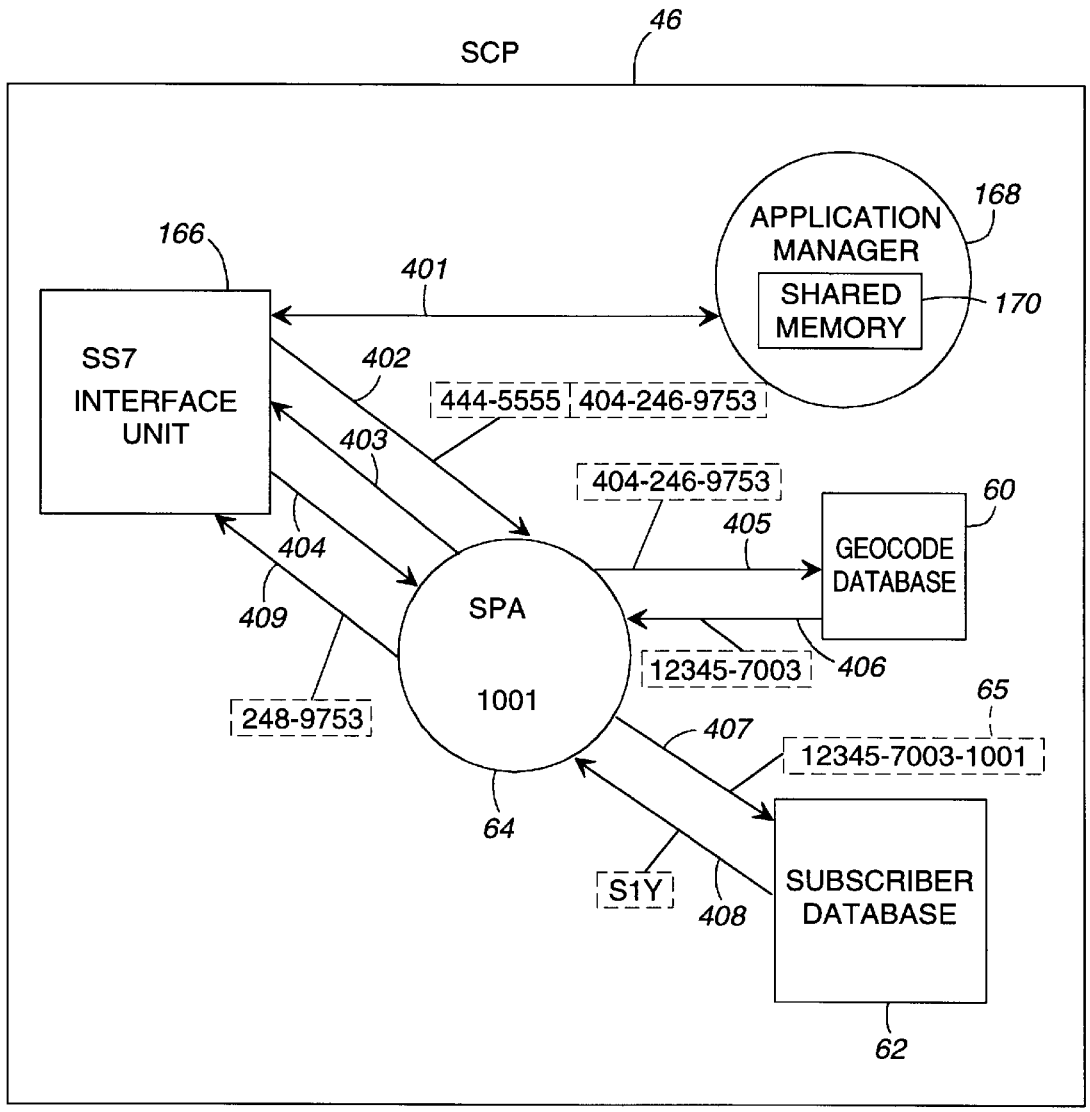
FIG. 4 shows the databases implemented with the present invention and the order of accessing the databases.

Thus, referring to FIGS. 3 and 4, the system and methods are shown by which the present invention provides the capability of storing large quantities of data and accessing the data during real time processing to make an appropriate determination for call completion. The present invention accomplishes the processing of call data by implementing two real-time databases in conjunction with a service package application and associated tables. The present invention implements a geocode database 60 and a subscriber database 62 in conjunction with the service package application 64. The geocode database 60 contains a mapping between the calling party number and the zip code area from which the calling party number originates. In addition to implementing and containing the programs for carrying out the logic of zip code routing, the SPA 64 contains a list of subscriber ID's for the multiple subscribers to the service. As noted above, although a subscriber may have many subscriber locations, a subscriber has only one telephone number that serves as the dialed number for this service. The SPA contains tables which relate the single subscriber telephone number to a corresponding subscriber ID. Each subscriber to the service has a subscriber ID that corresponds directly to the single telephone number assigned to the subscriber for the service. The subscriber database 62 contains a subscriber database key. The subscriber database key comprises the zip code and subscriber ID, and allows selection of subscriber location (site) ID in the database. The SPA 64 contains tables which assign the subscriber locations identified from the subscriber database 62 to a directory number corresponding to a subscriber location. A call from the calling party is then routed to the particular subscriber location identified at the subscriber database 62.

With reference to FIG. 3, a representation of the order of processing translation data at the SCP 46 will be discussed. At step 302, a data packet of information is received at the SCP 46 with the subscriber or dialed number 32, 444-5555, the calling party number 16, 404-246-9753 and the LATA ID 238. With these three fields of information, the SCP 46 can determine the appropriate subscriber location 18 to which the call should be directed. The SCP makes the determination by translating the calling party number into a geographic code or zip code and by translating the dialed subscriber number and the LATA ID into a subscriber ID. As shown at step 304, the geocode database 60 contains calling party numbers mapped to the appropriate zip code area from which the calling party number is located. In this example, the calling party number 16, 404-246-9753 is used as a key into the geocode database 60 which then translates the number 404-246-9753 into the zip code area 12345-7003. The zip code area 12345-7003 is then returned to the SPA for further operations. As shown in step 306, the SPA accesses a table of subscriber ID's with the dialed telephone number 30, in this example 404-444-5555. It should be appreciated that ten-digit directory numbers are implemented with the present invention but that seven-digit numbers are shown for illustration purposes. From the table shown at step 306, the dialed number 444-5555 is translated into subscriber ID 1001.

As noted above, the decision graphs or recent change mechanisms permit data structures similar to tables in a relational database to be implemented in the SPA. The data structures can be used to store the relationships among subscriber ID, zip code, and subscriber location ID, etc. The SPA can use the data structures to make call routing determinations. However, as noted above, data structures located at the SPA are not large.

Additionally, real-time databases which are large enough to store such large volumes of data accept only one field of information and provides output information in response. Generally, in the art, because real-time databases only accept a single key, a separate database would normally be constructed or maintained for each subscriber to the service. Providing a separate database for each subscriber can be costly. However, the present invention utilizes only one real-time database for the multiple subscribers.

In order to implement only one database for the multiple subscribers, the zip code area information from which the call originated is combined with the subscriber ID number, and additional fields as described herein, to yield a subscriber database key. The subscriber database key may then be used to identify a particular subscriber location 18 because the subscriber and the zip code of the calling party are identified in the single field. Additionally, because the subscriber database key has a subscriber ID contained therein data related to multiple subscribers may be stored and distinguished in a single database.

As shown at step 308, the zip code and the subscriber ID are combined at the SPA 64. At step 308, this subscriber database key 65 is then used to access the subscriber database 62 in order to obtain the appropriate subscriber site ID. The subscriber site ID corresponding to the subscriber is then returned to the SPA. In this example, the subscriber database key 65 12345-7003-1001, corresponds to site ID S1Y subscriber which is the Pizza Place location S1Y. The key 65 is given as an example. An actual key used with the system of the present invention has twenty-four digits such as 438100109123457003000000 where 438 is the LATA ID, the subscriber ID is 1001, the code (geocode) length specified is 09, and the zip code is 123457003 followed by 000000. Because the subscriber's area of service may span more than one LATA, the LATA ID as combined with the subscriber ID may be considered as the subscriber ID. It should be appreciated that two other digits for further defining the geographic area may be used instead of "000000". Also, in implementation the subscriber site ID is given as a whole number rather than the letter-number combination S1Y. The subscriber site ID is then used to access a table at the SPA during step 312. The table shown at step 312 maps the subscriber site ID to a particular telephone number or the location S1Y. The call from the calling party is then routed to subscriber location S1Y which has a directory number of 404-248-9753. This completes the connection of a call from a caller to the appropriate subscriber location.

Additionally, an advantage of the present system is to provide a subscriber site ID in the subscriber database 62 rather than providing the telephone number in the subscriber database. By providing the subscriber site ID rather than the telephone number, if the telephone number of a particular subscriber location is changed, only the number in the SPA table associating the subscriber site ID's to telephone number needs to be changed. The amount of data that needs to be changed can be considerably less than if such indirection is not provided. Thus, using the subscriber site ID provides efficiency and flexibility because the telephone number associated with a particular location would not have to be changed in every record associated with the subscriber location in the subscriber database. Because one subscriber database is used, it is relatively easy to add or remove subscribers from the subscriber database 62 as compared to having to install a new database each time a new subscriber desired the service or having to remove a database when a subscriber no longer desired the zip code routing service.

FIG. 4 shows the query process at the (SCP) 46. An incoming query from a service switching point enters the SCP computer via the SS7 interface unit 166. The SS7 interface unit 166 performs message transfer part and signal connection control part (SCCP) parsing of the message as known to those skilled in the art and extracts the service key parameter. The SS7 interface unit 166 then invokes an application manager 168 library routine which accesses tables in a shared memory segment manager 170, as shown by arrow number 401.

The application manager 168 subroutine determines the nature of the service requested (zip code routing or other customer service). Particularly, the application manager 168 subroutine determines to which zip code routing application 64 the query should be routed based on the signal connection control part (SCCP) subsystem number (SSN). The SS7 interface unit 166 sends the query to the application 64 as determined by application manager 168 using message handler functions, as shown by message number 402. The incoming query from the SS7 interface unit 166 is received by the zip code routing application 64.

With continuing reference to FIG. 4, the zip code routing application 64, on receiving the record for the incoming query, processes the query according to the zip code routing feature logic discussed below. If the calling party number is not available in the query, it may be necessary to send a prompt and collect conversation message back to the triggering service switching point (SSP) 42 (FIG. 2) and receive the collected digits in response. In this case, the application 64 will send a prompt and collect command to the SS7 interface unit 166 as shown by message 403, the SS7 interface unit 166 will in turn send a formatted transactions capabilities application part (TCAP) conversation message with signal connection control part (SCCP) and message transfer part headers appended and route the message to the triggering service switching point (SSP) 42 over the SS7 network 45 (FIG. 2).

Upon receiving a response, the SS7 interface unit 166 extracts the transaction identification from the response to determine which call instance of the SPA application 64 should process the message without invoking application manager 168 again. The SS7 interface unit 166 then forwards the transactions capabilities application part (TCAP) message to the zip code routing application 64, as shown by message number 404. If the calling party number is present in the original query, messages 403 and 404 are not required.

If the calling party number is within the subscriber's area of service, the calling party number is translated into a zip code as discussed below. This translation is performed by the geocode database 60. The zip code routing application 64 will send a geocode (zip code) lookup action record to the geocode database 60, as shown by message 405. The geocode database 60 performs the translation and returns the zip code to the zip code routing application 64, as shown by message number 406.

The zip code must then be translated into a subscriber site ID for the particular subscriber. At the SPA, the subscriber ID is combined with the zip code to determine a subscriber database key. The SPA then sends a subscriber database look-up containing the subscriber database key as indicated by message 407. The subscriber database 62 performs the translation to a subscriber site ID and returns the site ID to the SPA as indicated by message 408.

The application 64 will then select the subscriber destination to which the call should be routed according to the feature logic and subscriber data. The application 64 will format and send a transactions capabilities application part (TCAP) response message back to the SS7 interface unit 166 containing the directory number (DN) of this subscriber location, such as location 18 (FIGS. 1A, 1B, and 2), as shown by message number 409. The SS7 interface unit 166 will add signal connection control part and message transfer part headers, send the response message to the triggering service switching point (SSP) 42 (FIG. 2), and end the transaction.

The geocode database illustrated in FIG. 4 has each calling party number in the telephone company's region assigned to the zip code area in which it is located. The geocode database 60 (which has 10-digit telephone numbers assigned to the 9-digit zip codes in which they reside) is established before zip code routing is provided to a subscriber. Also, the subscriber database 62 is compiled and established before the service is provided. The master copy of the geocode database 60 and the subscriber database 62 for the entire region is located at the service management system (SMS) 48 (FIG. 2). SMS 48 sends to the SCP 46 the portion of databases that corresponds to the zip codes within the LATAs that the SCP 46 serves, where zip code routing is provided.

Figure 5:
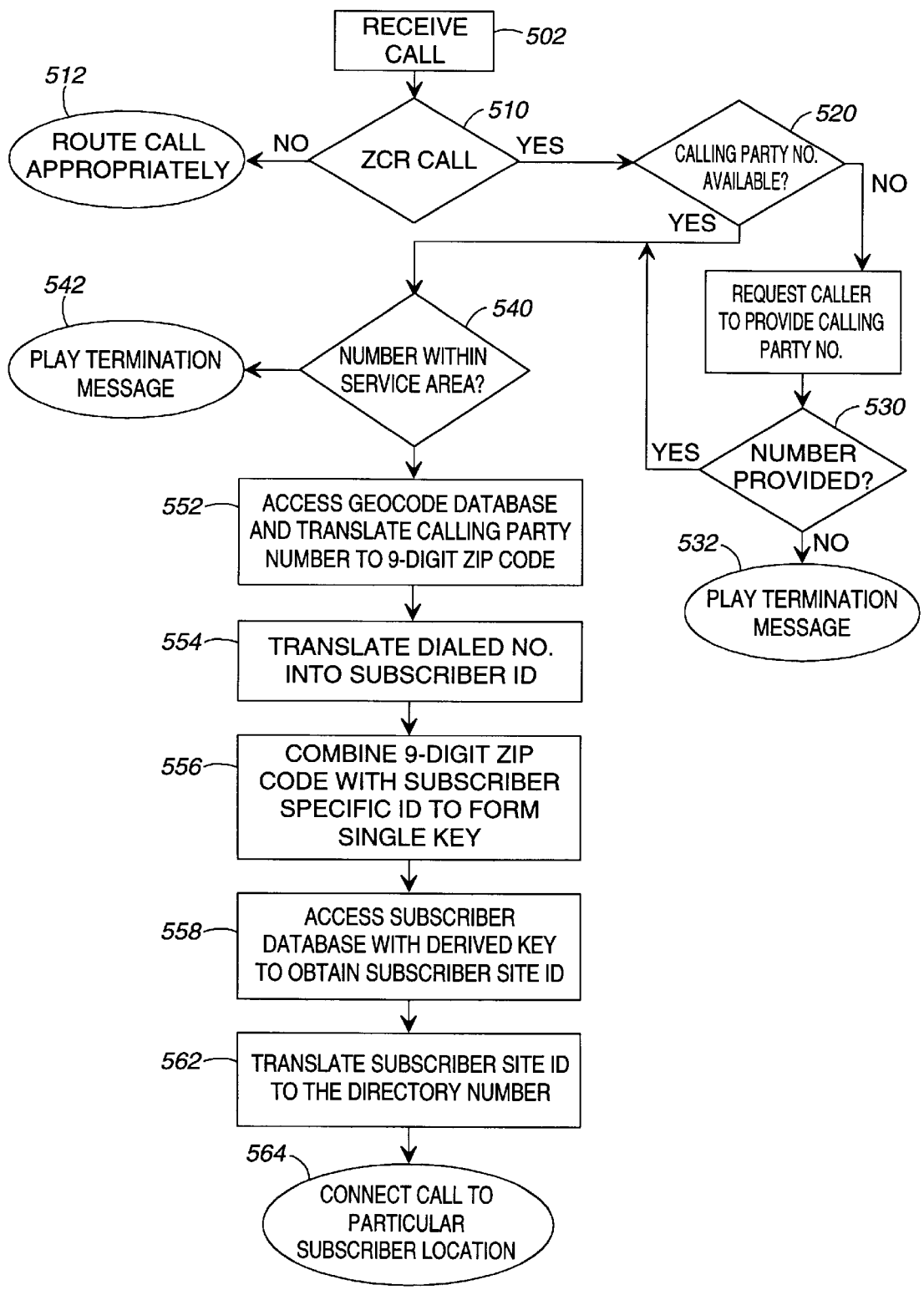
FIG. 5 is flow diagram of the steps implemented in an embodiment of the present invention.

Referring to FIG. 5, a flow diagram for implementing the computer-implemented process for routing calls based upon the geographic location of a caller is shown. Referring to FIGS. 1A, 1B, 3, and 5, the computer-implemented process for routing a call to the appropriate subscriber will be described. At step 502, the SCP 46 receives a call from a calling party. At step 510, a determination is made as to whether the call is an active zip code routing call or another call that requires other processing. If the call is not an active zip code routing call, then at step 512 the call is routed according to the service needed. It should be noted that a call may be identified as a zip code routing call by the dialed number but the identified zip code routing call may not be in service, in which case a terminating announcement may be provided to the caller. If, at step 510, the call is a zip code routing call, then the process proceeds to step 520. At step 520, a determination is made as to whether the calling party number is available. If the calling party number is not available, then at step 522 the caller is requested to enter the ten-digit calling party number. A determination is made as to whether a ten-digit calling party number was entered at step 530. If, at step 530, the ten-digit calling party number was not entered, then the termination message is played at step 532. However, if at step 530, the ten-digit calling number was entered then the process proceeds to step 540.

Also, if at step 520, the calling party was available, then the process proceeds to step 540. At step 540, a determination is made as to whether the calling party number falls within the subscriber's area of service (i.e., designated NPA-NXX's within the LATA). If the calling party number does not fall within the subscriber's area of service, then a termination message is played at step 542. If at step 540, the calling party number was determined to fall within the subscriber's area of service, then the process proceeds to step 552. At step 552, the geocode database is accessed with the calling party number and then the calling party number is translated into a nine-digit zip code. At step 554, the dialed number is translated into a subscriber ID. At step 556, the subscriber ID is combined with the nine-digit zip code to form a subscriber database key 65. The process then proceeds to step 558. At step 558, the subscriber database is accessed with the derived subscriber database key 65 in order to translate the subscriber database key 65 to a subscriber site ID. At step 562, the data structures in the service package application are accessed with the subscriber site ID and the subscriber site ID is translated into a directory number corresponding to the appropriate subscriber location for receiving the call. At step 564, the calling party is connected to the subscriber location identified in step 562. If the processed information does not provide a valid translation in the steps above a termination message may be provided or a call may be routed to a default telephone number for servicing error or incomplete call processing information.

As noted above, when storing large amounts of data such as data based upon nine-digit zip codes, a large amount of storage space that can be quickly accessed is used to handle the large volume of call-routing data. As discussed in connection with FIGS. 1A and 3, there is an entry in the subscriber database 62 corresponding to each zip code area as combined with the subscriber ID. Given the numerous quantity of nine-digit codes and subscribers, it can be easily seen that the volume of data contained in the subscriber database can be substantially large. Additionally, as discussed above, for each call as processed and discussed in connection with FIGS. 1A–4, a query is made to the subscriber database 62 from the service package application in order to determine the specific subscriber site that corresponds to the zip code area for a particular subscriber. Viewing FIG. 4, it can be seen that a query is made to the subscriber database 62 for each processed call. The query to the subscriber database 62 is shown as step 407 of FIG. 4. Also, a response query must be sent back from subscriber database 62 to the SPA 64 and in FIG. 4 the return information is shown as step 408. As discussed above, during call processing, and especially where large amounts of call processing time is an important factor in providing effective and efficient call routing services. Thus, a reduction in the data that is stored in an auxiliary subscriber database 62 would help alleviate storage problems and minimize the call processing time by minimizing the queries to the subscriber database 62. Minimizing the number of queries would provide an improvement to the system as discussion in connection with FIGS. 1A–4.

While the embodiments of the invention discussed in connection with FIGS. 1A–5 provide a method to route calls based on a large quantity of small areas (9-digit zip codes), the call routing process of FIGS. 1A–5 can be further enhanced by reducing the storage space utilized and by reducing the call processing time.

The disclosed embodiment discussed in connection with FIGS. 6A–10 provides such a system. The system of FIGS. 6A–10 helps to minimize storage space problems when large amounts of data are to be accessed during call processing and also minimizes the number of queries to an auxiliary database that is used to store large amounts of subscriber specific call processing data. Minimizing queries helps to provide faster, more efficient call processing.

Figure 6A:
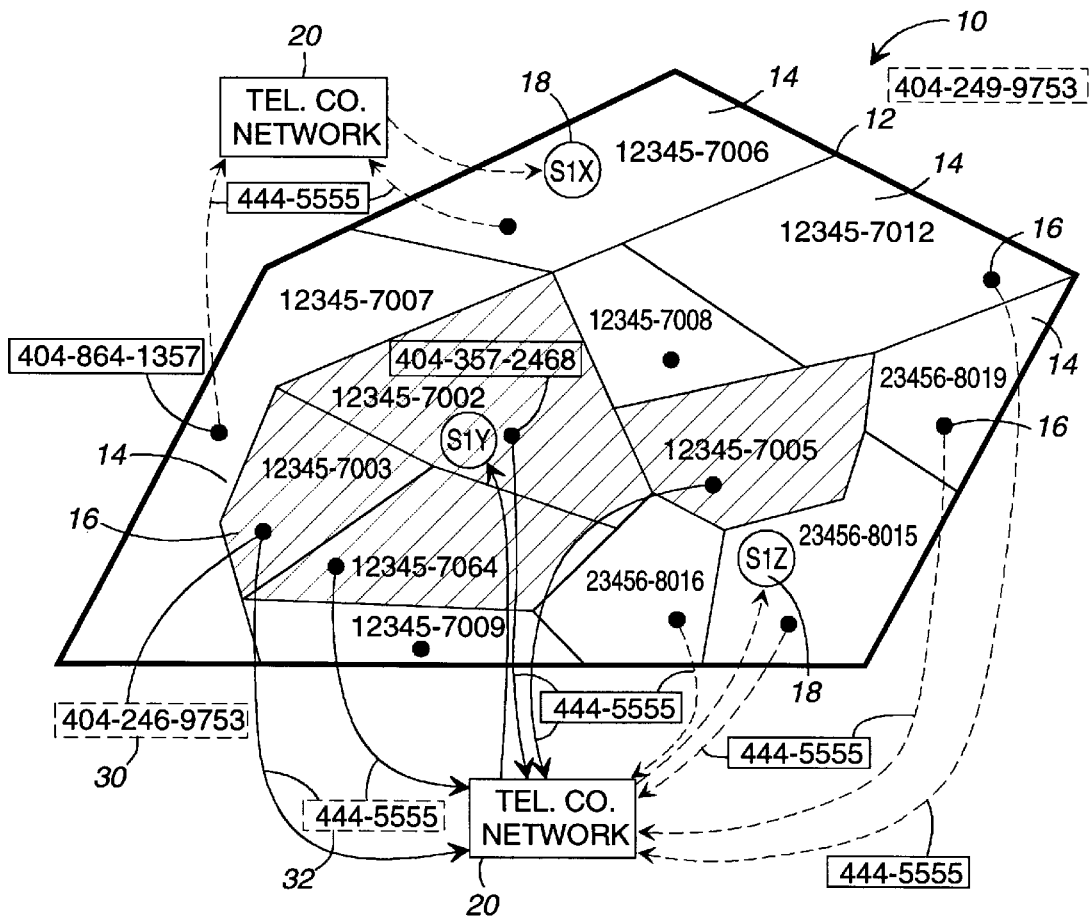
FIGS. 6A and 6B are general representations of the call area serviced by an embodiment of the geographic call routing system that uses location ranges to process calls.

Referring to FIG. 6A, the call routing assignments shown for Pizza Place are the same as shown in FIG. 1A. However, in FIG. 6A, a set of consecutively (sequentially) numbered zip codes that are routed to the same subscriber locations are shaded. For example, as discussed in connection with FIG. 1A, the calling party 16 represented by the calling party number 30, shown as 404-246-9753, dials for example the subscriber Pizza Place, which has a dialed number 32, shown as 444-5555. The telephone company 20 recognizes the dialed number 32 as a number designated for the zip code routing service. The telephone company network then translates the telephone number 30 into the appropriate zip code or location identifiers, 12345-7003. The telephone company 20 then accesses the appropriate assignments designated by the Pizza Place and determines that location S1Y is designated to receive calls from the zip code area 12345-7003. After making this determination, the call from the calling party number 30 is routed to Pizza Place location S1Y. Also as discussed in connection with FIG. 1A, it should be noted that the calling parties 16 located in zip codes 12345-7002, 12345-7004, 12345-7005, and 12345-7012 are all routed to Pizza Place location S1Y, as indicated by the solid arrow lines directed to telephone company network 20 and the solid arrow line directed from telephone company 20 to Pizza Place location S1Y.

The calling parties from the other zip code areas are routed to the same subscriber locations as discussed in connection with FIG. 1A. However, the data storage is reduced and queries are minimized by utilizing selected range values as shown shaded in FIG. 6A.

As shown in FIG. 6A, a set of sequentially numbered zip codes assigned to the same subscriber location S1Y are shown as shaded zip code areas. In this example, the sequentially numbered zip code areas are 12345-7002, 12345-7003, 12345-7004 and 12345-7005. Rather than storing each of the consecutively numbered and shaded zip code areas 12345-7002 through 12345-7005 with the subscriber ID in the subscriber database, a table of ranges is created and stored at the SPA 64 for the sequentially numbered zip codes which are to be routed to the same subscriber location. By utilizing the range values, storage associated with zip code routing can be reduced.

Figure 6B:
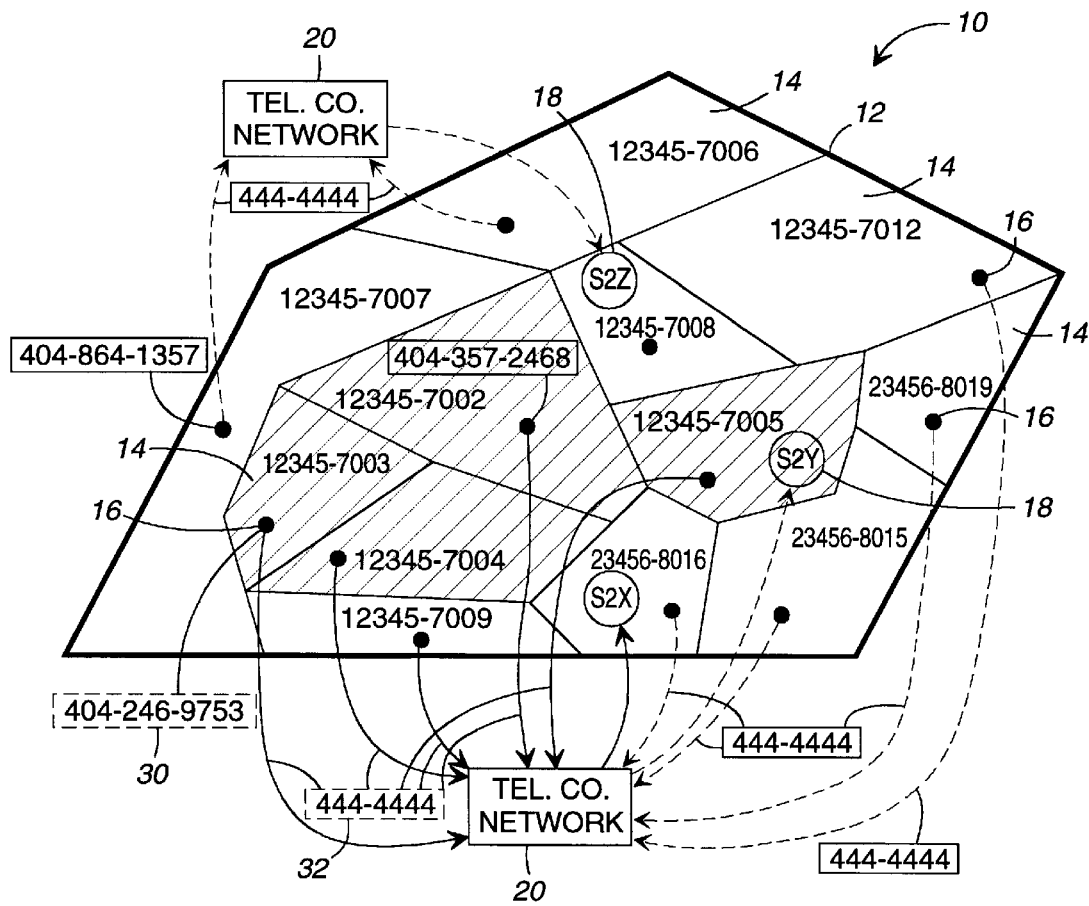

FIG. 6B also shows a shaded set of sequentially numbered zip code areas that are assigned to the Pizza House location S2X. The call routing assignments of FIG. 6B are the same as those discussed in connection with FIG. 1B.

Figure 7A:
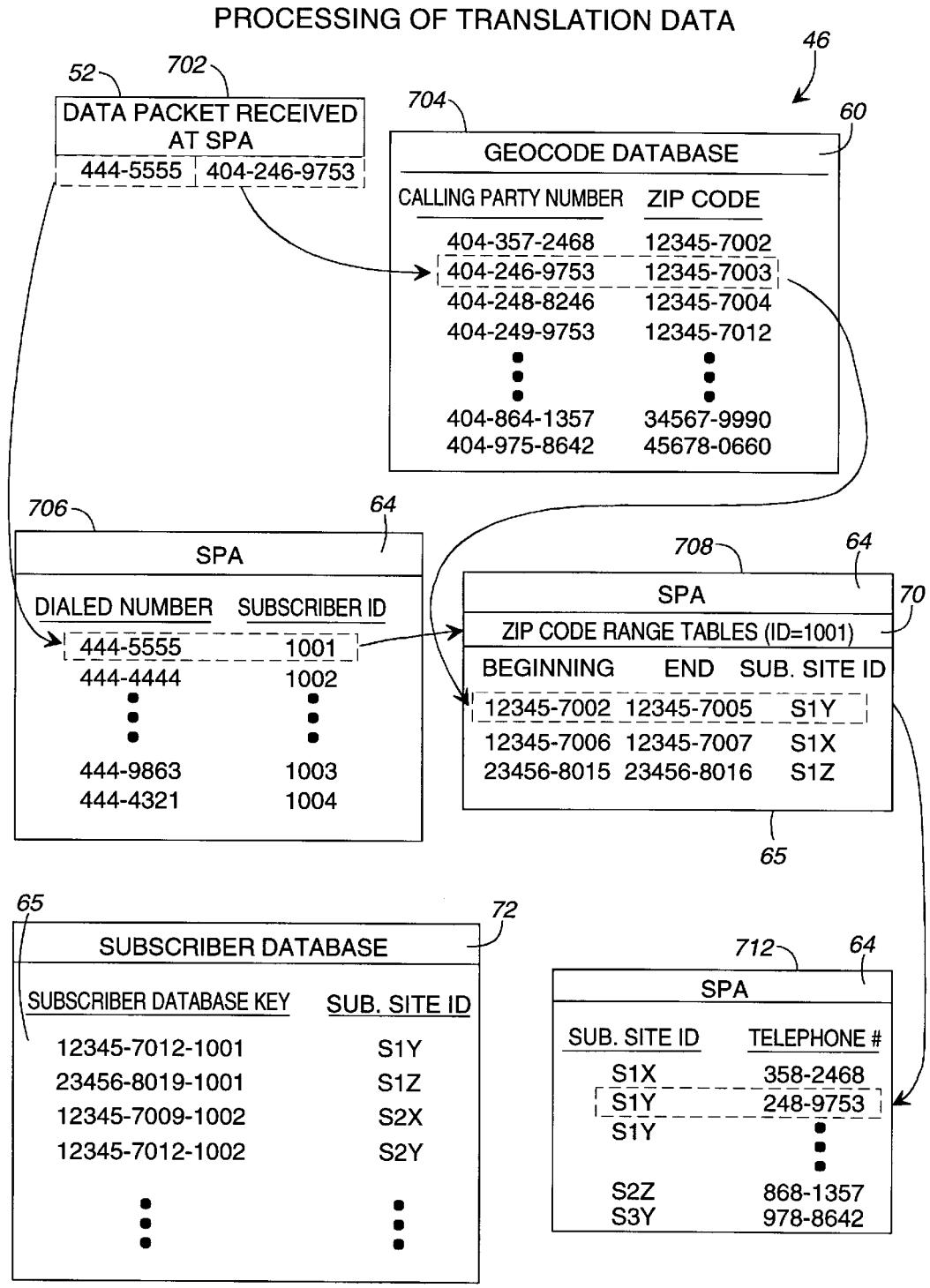
FIGS. 7A and 7B show the order of processing translation data when location ranges are used.

Referring to FIG. 7A, a range table 70 is shown for the zip code routing assignments illustrated in FIG. 6A. The range table 70 is shown as having a beginning value for each range and an end value for each range. Any value that falls between the beginning and the end value for the range is determined to be within the range and is consequently assigned to the subscriber site location assigned to the range. For example, a range of range assignment 71 of the range table 70 shows a beginning range value of 12345-7002 and an end range value 12345-7005 which corresponds to subscriber site location S1Y. By utilizing the range assignment 71 of range table 70 as shown, only one table entry is utilized to represent the four zip code areas and the subscriber site assignments rather than four individual zip code area-subscriber ID combinations as shown in the subscriber database 62 of FIG. 3. Other ranges shown are 12345-7006 through 12345-7007 which correspond to subscriber site location S1X and the range 23456-8015 through 23456-8016 which corresponds to subscriber site location S1Z. It should be appreciated that the ranges utilized with the present invention are optimized when the range contains many zip code areas. The range values and the zip code range table 70 are given as examples.

Because the range values have been used in connection with the subscriber assignments for subscriber site location S1Y, only one subscriber database key is created for the S1Y locations, and this one key is assigned to the single zip code area assigned to subscriber site location S1Y that does not fall within the range 71. The subscriber database key created and stored in the subscriber database 72 is shown as 12345-7012-1001 and corresponds to subscriber site ID S1Y as shown in subscriber database 72. It should be appreciated that the subscriber database keys are created in the same manner as discussed in connection with FIG. 3. However, as noted above a subscriber database key is created for those zip code routing assignments which do not fall within a range found in the zip code range table 70. In the example of FIG. 6A, a subscriber database key only has to be created for the zip code area 12345-7012 as compared to the five subscriber database keys and entries that correspond to the zip code areas 12345-7002, 12345-7003, 12345-7004, 12345-7005, and 12345-7012 as implemented with the database 62 of FIG. 3. Thus, the embodiment disclosed in FIG. 6A can significantly reduce the amount of data that is stored in subscriber database 72 and a more efficient call routing system is provided. Also, as discussed in more detail below, because the range values are stored at the SPA 64, the subscriber database 72 only is queried when a zip code area does not fall within one of the selected ranges.

Figure 7B:
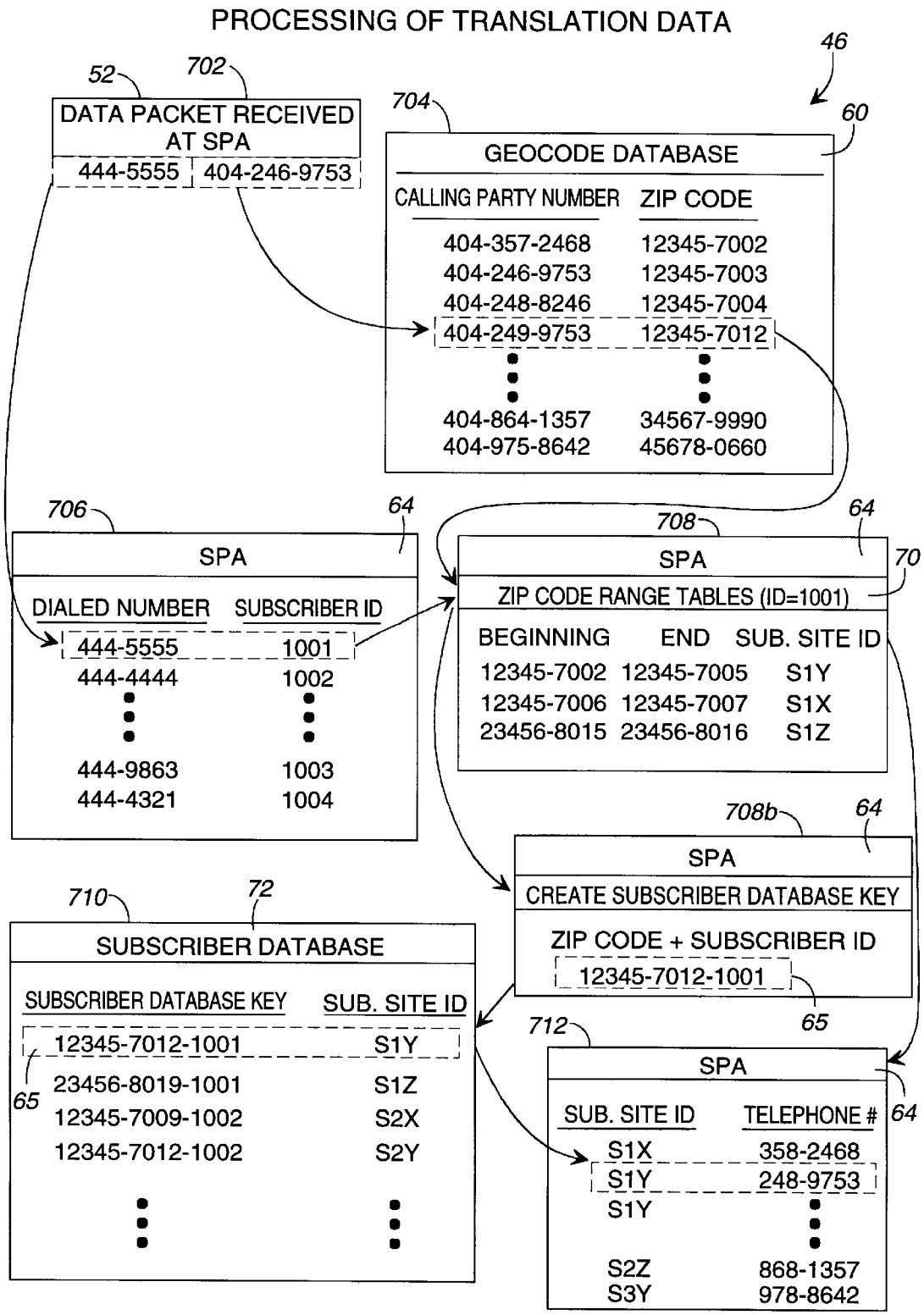
Figure 8A:
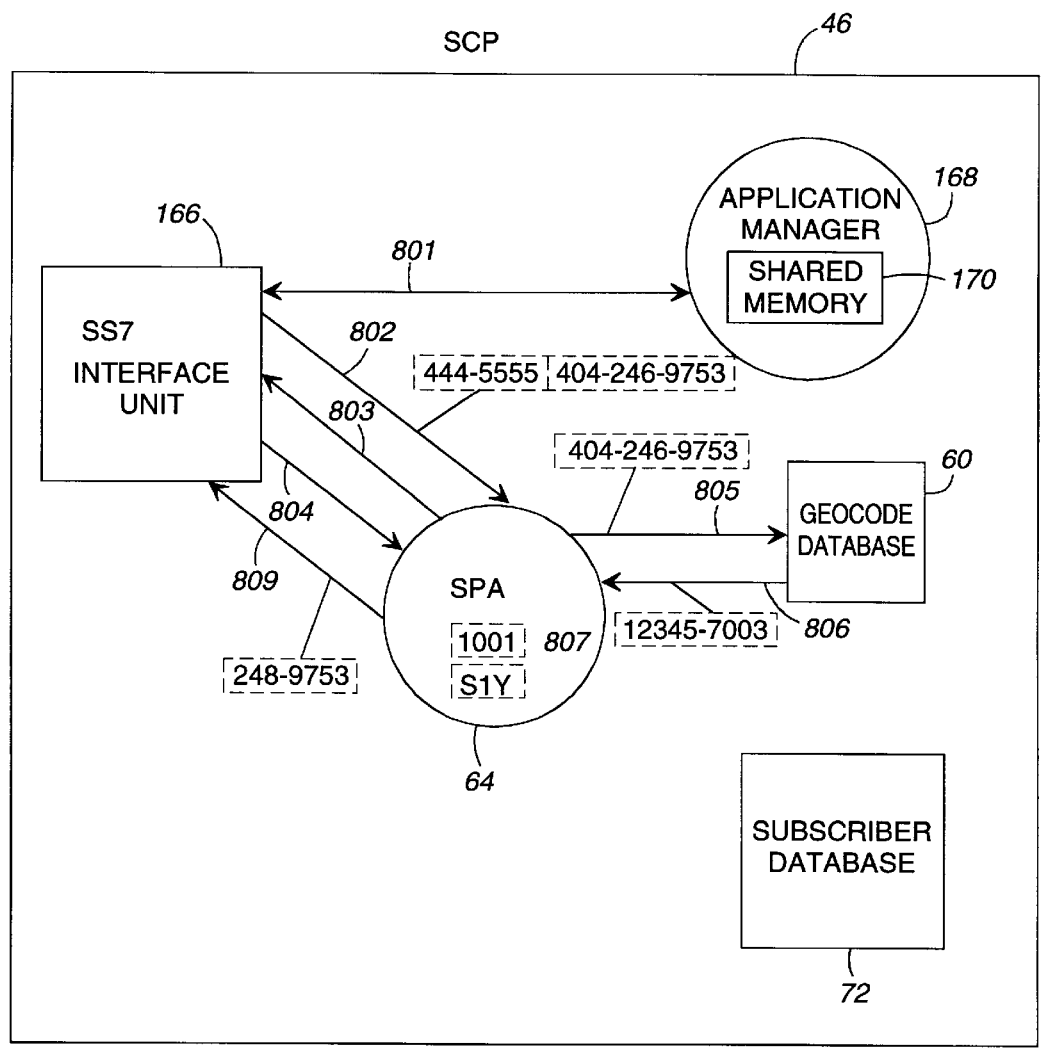
FIGS. 8A and 8B show the databases utilized and the order of accessing the databases when location ranges are used.

Referring to FIGS. 7A and 8A, the system and methods by which the embodiment of FIG. 7A–8B provides the capability of handling large quantities of data and accessing the data during real time call processing is shown. The disclosed embodiment of the invention accomplishes the processing of call data by implementing two real-time databases in conjunction with a service package application and associated routing tables. The present invention implements a geocode database 60 and a subscriber database 72 in conjunction with the service package application 64. As discussed in connection with FIG. 3, the geocode database 60 contains a mapping between the calling party number and the zip code area from which the calling party number originates. In addition to implementing and containing the programs for carrying out the logic of zip code routing, the SPA 64 contains a list of subscriber ID's for the multiple subscribers to the service. As noted above, although a subscriber may have many subscriber locations, a subscriber has only one telephone number that serves as the dialed number for this service. The SPA contains tables which relate the single subscriber telephone number to a corresponding subscriber ID. Each subscriber to the service has a subscriber ID that corresponds directly to the single number assigned to the subscriber for the service. The SPA 64 has a table 70 of zip code ranges that is searched to determine if the retrieved zip code falls within the range. If so, the subscriber site ID corresponding to the range is used to route the call. As similarly discussed above in connection with the subscriber database 62, the subscriber database 72 contains a subscriber database key 65 that corresponds to a designated subscriber location. The subscriber database key 65 allows for proper selection of the subscriber location when the retrieved zip code does not fall within a range provided in the range table 70. The SPA 64 contains tables as shown at 712 which assign the subscriber locations identified from the subscriber database 72 to a corresponding subscriber location. A call from the calling party may then be routed to the particular subscriber location identified from the subscriber database 72.

With reference to FIG. 7A, the order of processing translation data at the SCP 46 will be discussed. At step 702, a data packet of information is received at the SCP 46 which contains the subscriber or dialed number 32, 444-5555, and contains the calling party number 16, 404-246-9753. With these two fields of information, the SCP 46 can determine the appropriate subscriber location 18 to which the call should be directed. The SCP makes the determination by translating the calling party number into a geographic code or zip code and by translating the dialed subscriber number into a subscriber ID. As shown at step 704, the geocode database 60 contains calling party numbers mapped to the appropriate zip code area from which the calling party number is located. In this example, the calling party number 16, 404-246-9753 is used as a key into the geocode database 60 which then translates the number 404-246-9753 into the zip code area 12345-7003. The zip code area 12345-7003 is then returned to the SPA for further operations. As shown in step 706, the SPA accesses a table of subscriber ID's with the dialed telephone number 30, in this example 444-5555. It should be appreciated that ten-digit directory numbers are implemented with the present invention but that 7-digit numbers are shown for illustration purposes. From the table shown at step 706, the dialed number 444-5555 is translated into subscriber ID 1001.

As shown at step 708, the zip code range tables corresponding to the subscriber ID 1001 is accessed. The zip code range table 70 is searched using the zip code 12345-7003, which was retrieved from the geocode database 60, as the key for determining whether this zip code falls within any of the ranges located within the zip code range table 70. In this case, the zip code 12345-7003 is located within the range of range assignment 71 that has a beginning value of 12345-7002 and an end value of 12345-7005. This range corresponds to subscriber site location S1Y. The subscriber site ID is then used to access a table at the SPA during step 712. The table shown at step 712 maps the subscriber site ID to a particular telephone number or the location S1Y. The call from the calling party is then routed to the subscriber location S1Y which has a directory number of 248-9753. This completes the connection of a call from a caller to the appropriate subscriber location. Note in this example that no query was made to the subscriber database 72 to determine the appropriate subscriber location for call routing.

By using range table 70 at the SPA 64, call processing time is improved because no additional query is necessary for zip codes falling within the ranges specified in the zip code range table 70. Thus, call processing time for the system is improved over the embodiments discussed in connection with FIGS. 3 and 4. In the embodiment discussed in connection with FIGS. 3 and 4, the SPA 64 makes two auxiliary database queries for each call: one to the geocode database to obtain zip code information associated with a caller and one to the subscriber database to obtain specific subscriber location information for the subscriber. However, in the embodiment of FIGS. 6A–7B, a query is made to the database 72 only for selected calls. Thus, call processing time can be minimized.

FIG. 8A shows the query process at the (SCP) 46 for the zip code range embodiment discussed in connection with FIG. 6A and 7A. The query process of FIG. 8A is similar to the query process of FIG. 4A except that an additional query to the subscriber database 72 is not required in the embodiment of FIG. 8A as discussed below. An incoming query from a service switching point enters the SCP computer via the SS7 interface unit 166. The SS7 interface unit 166 performs message transfer part and signal connection control part (SCCP) parsing of the message as known in to those skilled in the art and extracts the service key parameter. The SS7 interface unit 166 then invokes an application manager 168 library routine which accesses tables in a shared memory segment manager 170, as shown by arrow number 801.

The application manager 168 subroutine determines the nature of the service requested (zip code routing or other customer service). Particularly, the application manager 168 subroutine determines to which zip code routing SPA 64 the query should be routed based on the signal connection control part (SCCP) subsystem number (SSN). The SS7 interface unit 166 sends the query to the SPA 64 as determined by application manager 168 using message handler functions, as shown by message number 802. The incoming query from the SS7 interface unit 166 is received by the zip code routing SPA 64.

With continuing reference to FIG. 8A, the zip code routing SPA 64, on receiving the record for the incoming query, processes the query according to the zip code routing feature logic discussed below. If the calling party number is not available in the query, it may be necessary to send a prompt and collect conversation message back to the triggering service switching point (SSP) 42 (FIG. 2) and receive the collected digits in response. In this case, the SPA 64 will send a prompt and collect command to the SS7 interface unit 166 as shown by message 803, the SS7 interface unit 166 will in turn send a formatted transactions capabilities application part (TCAP) conversation message with signal connection control part (SCCP) and message transfer part headers appended and route the message to the triggering signal switching point (SSP) 42 over the SS7 network 45 (FIG. 2).

Upon receiving a response, the SS7 interface unit 166 extracts the transaction identification from the response to determine which call instance of the SPA 64 should process the message without invoking application manager 168 again. The SS7 interface unit 166 then forwards the transactions capabilities application part (TCAP) message to the zip code routing SPA 64, as shown by message number 804. If the calling party number is present in the original query, messages 803 and 804 are not required.

If the calling party number is within the subscriber's area of service, the calling party number is translated into a zip code as discussed below. This translation is performed by the geocode database 60. The zip code routing SPA 64 will send a geocode (zip code) lookup action record to the geocode database 60, as shown by message 805. The geocode database 60 performs the translation and returns the zip code to the zip code routing SPA 64, as shown by message number 806.

The zip code must then be translated into a subscriber site ID for the particular subscriber. As discussed in connection with FIG. 7A, a table 70 of zip code ranges is accessed at the SCP 46 to determine if the call destination determination can be completed at the SPA without a query to the subscriber database 72. If the zip code obtained from the geocode database 60 falls within a range in the range table 70 located at the SPA then no query is needed to the subscriber database 72. In this example, at step 807 the zip code 12345-7003 falls within the range of range table 71 of range table 70 and yields a subscriber location S1Y. Thus, no query is generated to the subscriber database 72 as illustrated in FIG. 8A.

The SPA 64 will then select the subscriber destination to which the call should be routed according to the feature logic and subscriber data. The SPA 64 will format and send a transactions capabilities application part (TCAP) response message back to the SS7 interface unit 166 containing the directory number (DN) of this subscriber location, such as location S1Y (FIG. 6A), as shown by message number 809. The SS7 interface unit 166 will add signal connection control part and message transfer part headers, send the response message to the triggering service switching point (SSP) 42 (FIG. 2), and end the transaction.

With reference to FIG. 7B, the order of processing translation data at the SCP 46 for a zip code area not found within a zip code range will be discussed. At step 702, a data packet of information is received at the SCP 46 which contains the subscriber or dialed number 32, 444-5555, and contains the calling party number 16, 404-249-9753. With these two fields of information, the SCP 46 can determine the appropriate subscriber location to which the call should be directed. The SCP makes the determination by translating the calling party number into a geographic code or zip code and by translating the dialed subscriber number into a subscriber ID. As shown at step 704, the geocode database 60 contains calling party numbers mapped to the appropriate zip code area from which the calling party number is located. In this example, the calling party number 16, 404-249-9753 is used as a key into the geocode database 60 which then translates the number 404-249-9753 into the zip code area 12345-7012. The zip code area 12345-7012 is then returned to the SPA for further operations. As shown in step 706, the SPA accesses a table of subscriber ID's with the dialed telephone number 30, in this example 444-5555.

At step 708, as discussed in connection with FIG. 7A, a table of zip code ranges 70 is accessed at the SPA 46 to determine if the call destination determination can be completed at the SPA without a query to the subscriber database 72. If the zip code obtained from the geocode database 60 falls within a range in the range table 70 located at the SPA then no query is needed to the subscriber database 72. However, in this example, the zip code 12345-7012 does not fall within a range of range table 70. Thus, the process proceeds to step 708b where a subscriber database key is created for the zip code 12345-7012.

As shown at step 708b, the zip code and the subscriber ID are combined at the SPA 64. At step 710, this subscriber database key 65 is then used to access the subscriber database 72 in order to obtain the appropriate subscriber site ID. The subscriber site ID corresponding to the subscriber is then returned to the SPA. In this example, the subscriber database key 65, 12345-7012-1001, corresponds to subscriber site ID S1Y which is the Pizza Place location S1Y. The subscriber site ID is then used to access a table at the SPA 64 during step 712. The table shown at step 712 maps the subscriber site ID to a particular telephone number or the location S1Y. The call from the calling party is then routed to subscriber location S1Y which has a directory number of 248-9753. This completes the connection of a call from a caller to the appropriate subscriber location.

Figure 8B:
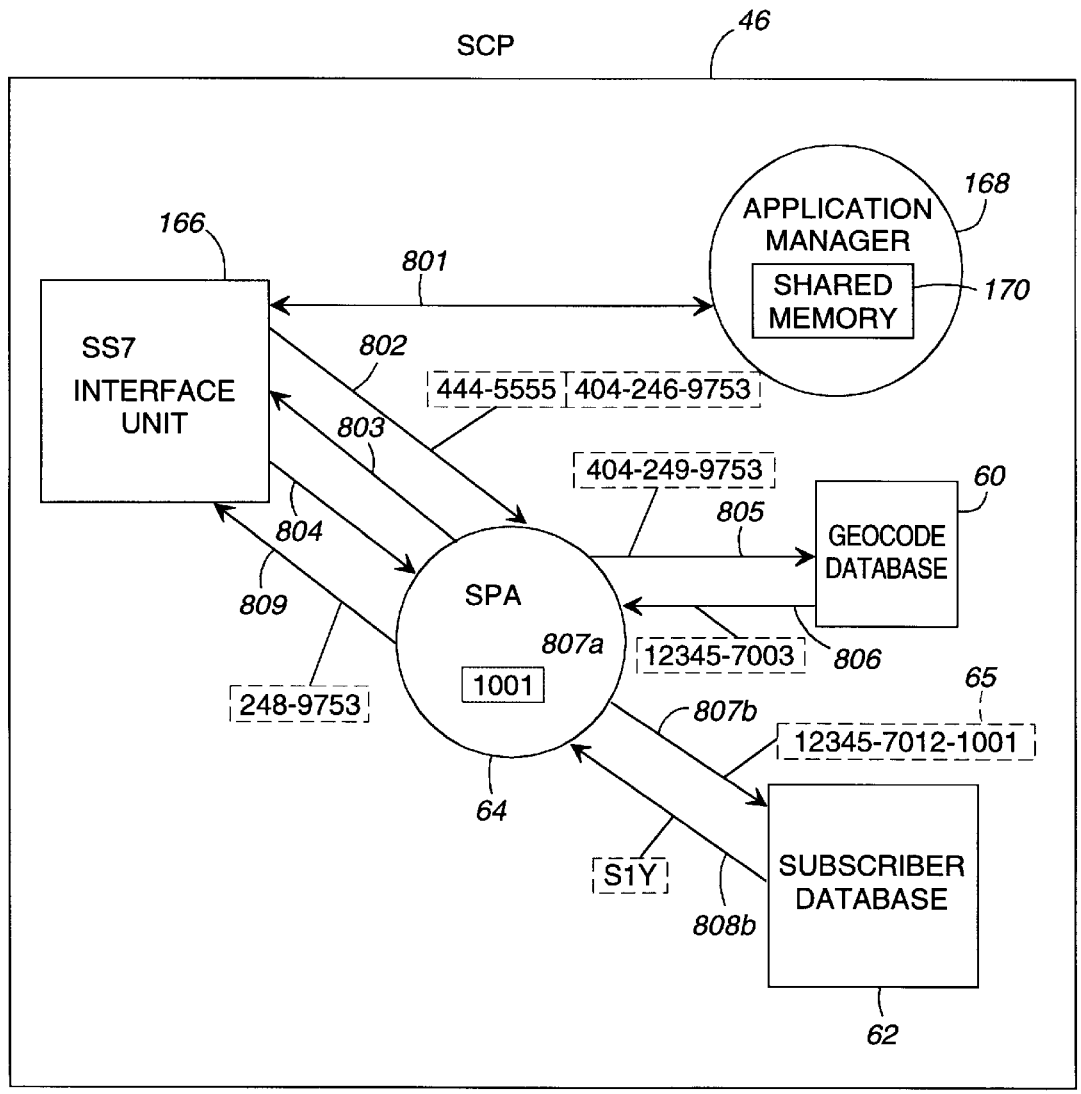

FIG. 8B shows the query process at the SCP 46 for the call process discussed in connection with FIG. 7B. The steps of the query process of FIG. 8B are the same as the steps 801–806 discussed in connection with FIG. 8A. However, at step 807a, when the table of zip code ranges 70 is accessed at the SCP 46 to determine if the call destination determination can be completed at the SCP, the zip code 12345-7012 does not fall within a range of range table 70. Thus, the process proceeds to step 807b where a subscriber database key is used to access the subscriber database 72.

The zip code is then translated into a subscriber site ID for the particular subscriber at the subscriber database 72. At the SPA 64, the subscriber ID is combined with the zip code to create a subscriber database key. The SPA 64 then sends a subscriber look-up table record containing the subscriber database key as indicated by message 807b. The subscriber database 72 performs the translation to a subscriber site ID and returns the subscriber site ID to the SPA 64 as indicated by message 808b.

The SPA 64 will then select the subscriber destination to which the call should be routed according to the feature logic and subscriber data. The SPA 64 will format and send a transactions capabilities application part (TCAP) response message back to the SS7 interface unit 166 containing the directory number (DN) of this subscriber location, such as location S1Y as shown by message number 809. The SS7 interface unit 166 will add signal connection control part and message transfer part headers, send the response message to the triggering service switching point (SSP) 42 (FIG. 2), and end the transaction.

As discussed and shown above, zip code ranges can be used to both reduce the amount of data stored in an auxiliary subscriber database and to reduce the amount of queries to that database from a control unit such as the SPA 64. In the examples above, the zip codes implemented above were all 9-digit zip code areas. However, as described below, the present invention may operate using a combination of geographic categories (e.g., zip code specificity (granularity), such as 5-digit zip codes, 7-digit zip codes and 9-digit zip codes). Generally, a 5-digit zip code identifies a geographic location in the United States and a specific delivery post office. The next two digits (6th and 7th digits) signify a delivery sector, which may be several blocks, a group of streets, or a small geographical area. The last two digits (8th and 9th digits) may refer to a delivery segment, which might be one floor of an office building, one side of a street, specific departments in a firm or a group of post office boxes. The embodiments discussed in FIGS. 9A through 12 also implement zip code range routing as discussed in connection with FIGS. 6A–8B. However, FIGS. 9A through 12 show zip code routing based on multiple categories of zip codes areas.

As discussed above in connection with FIGS. 6A–7B, storing data in ranges minimizes data storage needs, and by storing the ranges in the SPA memory, queries to the subscriber database are minimized resulting in generally faster call processing time. By using ranges, more subscribers may be supported due to improved storage and improved query processing efficiency. As generally known, zip codes may be designated by varying degrees of specificity as indicated by 5-digit, 7-digit, and 9-digit zip codes. These varying degrees of specificity may also be stored and processed in ranges as discussed above. However, various data storage methods and structures may be used to help optimize processing of the multiple type ranges, as discussed in more detail below.

Selection of the various types of zip codes to use for routing may be as follows. If a 5-digit zip code is fully contained within the subscriber's area of service and is designated by the subscriber to be routed to a single subscriber location, the calls from the 5-digit zip code area do not have to be routed based upon a 7-digit or 9-digit zip code area because the 5-digit zip code designation will suffice. Call routing based upon 7-digit and 9-digit zip code areas may be used when the subscriber wishes to specifically delineate certain smaller areas contained within a 5-digit zip code area as going to one subscriber site versus another subscriber site or simply to provide the service to selected smaller areas within a 5-digit zip code area. As similarly discussed in connection with FIG. 6A, zip code ranges may also be used with the zip code numbers of various lengths or categories.

Figure 9A:
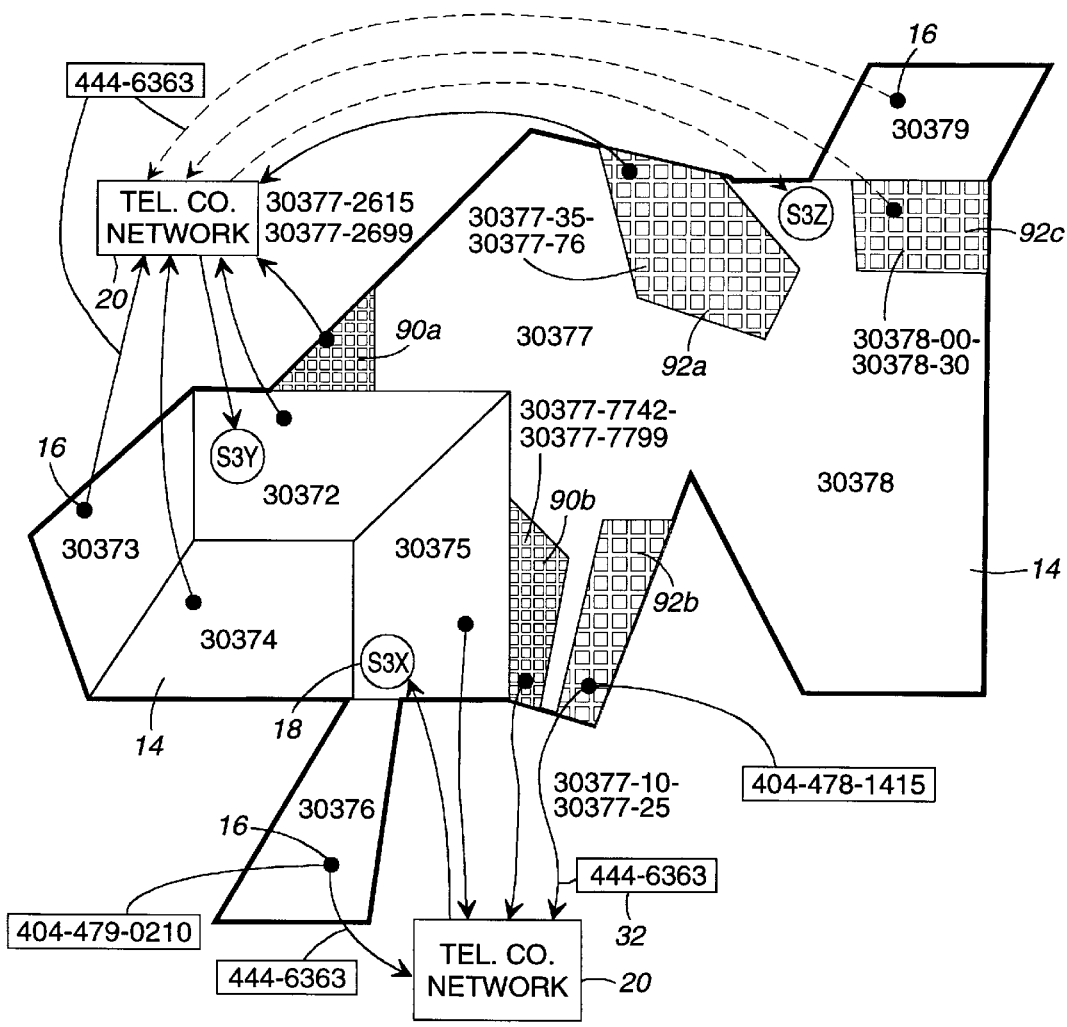
FIG. 9A shows a general representation of another call area that has multiple categories of demarcation for geographic areas used for call routing.

In FIG. 9A, areas 90a and 90b represent 9-digit zip code areas and areas 92a and 92b represent 7-digit zip code areas within the 5-digit zip code area 30377. Area 92c represents a 7-digit zip code area within the 5-digit zip code area 30378. FIG. 9A shows an area of service for a subscriber, Cleaning Services S3, who serves areas contained within zip codes 30372–30379. As indicated by the different size zip code areas specified, the subscriber S3 has designated routing based upon different length (size) zip code areas. The arrows from the calling party locations 16 to the telephone company locations 20, with an arrow leading to a particular subscriber location, indicates the subscriber's choice of routing in the same manner as discussed in connection with FIGS. 1A, 1B, 6A, and 6B. However, the type or range is determined at the telephone company 20 and processed appropriately.

Referring to FIG. 9B, three range tables are shown that indicate the subscriber's assignments of zip codes to subscriber locations. The three tables shown in FIG. 9B represent 5-digit zip code routing ranges, 7-digit zip code routing ranges and 9-digit zip code routing ranges. As shown in Table 9A, zip code areas 30372–30374 are routed to subscriber location S3Y. The zip code 30372 represents the beginning of the range and the zip code 30374 represents the end of the range, as generally discussed above in connection with FIG. 7A. As shown in the third entry line of Table 9A, the beginning and end of a zip code range can be the same zip code area, thus indicating that the single zip code area is routed to the designated subscriber location, such as the zip code area 30379 which is routed to subscriber location S3Z. Tables 9B and 9C similarly show the beginning and end values for the zip code ranges that are based on 7-digit and 9-digit zip code routing, respectively.

As shown in Tables 9A, 9B, and 9C the first column for each entry into the table contains an index value. The index value is the same length as the zip code area represented in the table. The index value for a range contains two parts: first, an identifier 95; and second, a sequence number 96. The length of the identifier varies depending on the type zip code specified. When 5-digit zip code routing is used the identifier is identical to the first three numbers of the first three digits of the beginning and the end value of the code range represented by the index. The last two numbers of the index represents the sequence number 96. The sequence numbers 96 are code values provided to uniquely identify each range within a range table. The sequence numbers preferably range from 00 to 49. As should be understood by those skilled in the art, the sequence numbers should be different for each range having identical identifiers in order to insure that each range may be uniquely identified.

The 7-digit range Table 9B and the 9-digit range Table 9C are constructed with index values similar to the index values discussed in connection with the 5-digit range table. The index values of the 7-digit and 9-digit ranges also contain the same two parts as the 5-digit ranges: first, the identifier 95; and second, the sequence number 96: The identifier 95 selected for the 7-digit range is 5 digits in length and the identifier 95 for the 9-digit range is 7 digits in length. The last two digits of these indices represent sequence numbers 96 to uniquely identify the ranges within the tables. Small ranges are preferably stored in the subscriber database as individual zip codes. It should be also understood that if a zip code entry is found in a range that the zip code entry found will not exist in a range of more defined granularity. For example, 30372 and 30373 exist in the 5-digit range table, and as a result there will not be any entries in the 7- or 9-digit zip code ranges whose indices begin with 30372 or 30373. The tables shown are searched to determine whether a zip code area is within a range in the following order: Table 9A followed by Table 9B followed by Table 9C. If the zip code is found in one table, the other tables are not searched.

Although multiple range tables may be used for storing zip codes of different granularities or lengths, it is desirable to have a single table that will allow storage of the different ranges for the multiple zip code lengths. Using a single table simplifies operations at the SPA. In order to store the 5, 7, and 9 digit zip codes in a single table, digits referred to herein as stub digits, are appended to the 5 and 7 digit zip code indexes to create indices of the same length. The indices for selected ranges therefore include the identifier and the sequence number followed by the stub value.

Referring to FIG. 10, a single table showing the 5-digit zip code ranges along with the 7-digit zip code ranges and 9-digit zip code ranges is shown. In FIG. 10, the indices of Table 10 are selected in a manner that enables the various type ranges to be stored and searched in a single table. In the table shown in FIG. 10, stub numbers 110 are added to make the zip code indices the same length. In the table shown in FIG. 10, the stubs 110 are shown as 9999 for the 5-digit zip code indices and the stub is shown as 99 for the 7-digit range zip code indices. Note that the indices for the 9-digit zip code ranges do not contain stub values because the length of the 9-digit indices is the length that the other indices are extended to equal. As noted above, 00 to 49 may be used as sequence numbers and, therefore, the stubs 9999 used for the 5-digit zip code ranges and the stub 99 used for the 7-digit zip code ranges generate unique indices. The indices may then be used as keys into a hash/binary table for searching to retrieve appropriate data as known by those skilled in the art. The range assignments to subscriber locations of FIG. 10 correspond to the range assignments discussed in connection with FIG. 9B.

Referring to FIG. 11, another method of storing zip code ranges is shown. The assignment of zip codes to subscriber locations corresponds to the assignments discussed in connection with FIGS. 9A and 9B. However, a greater number of indices are used to identify the ranges in the tables. In Table 11A of FIG. 11, no sequence number is used for storing 5-digit zip codes. The 5-digit zip code serves as the index. Because the number of 5-digit zip codes in a typical area of service associated with a subscriber location is small, the 5-digit zip code range is represented by the 5-digit zip code to be routed. In Table 11A, the indices are the same as the zip code range it represents. The beginning and end value for the range is the 5-digit zip code assigned to the subscriber location. During a look-up for Table 11A, it is not necessary to evaluate the beginning and end range values.

As discussed in connection with Table 9B of FIG. 9, the sequence number ranges from 00 to 49. Because in practice 7-digit zip code data is accessed often, the number of look-ups to access the 7-digit zip code data should be minimized. To reduce the number of look-ups, a one-digit sequence number is selected for Table 11B instead of the two-digit sequence number discussed in connection with Table 9B of FIG. 9. In this data storage structure or method, the index value contains a six-digit identifier 95, which are the same digits as the first six digits of range represented, along with a one-digit sequence number 96. Preferably, the sequence numbers range from 0–4, and the maximum number of look-ups will be five. As illustrated, a greater number of ranges and indices are used to specify the same routing assignments of Table 9B. By increasing the number of ranges per table, more storage space is used, however, the total number of look-ups to the range table is reduced because an index for a range may generally be more quickly located from the list. Thus, by using the storing method of FIG. 11, call processing time is improved because the total number of look ups to the table is reduced.

Figure 12:
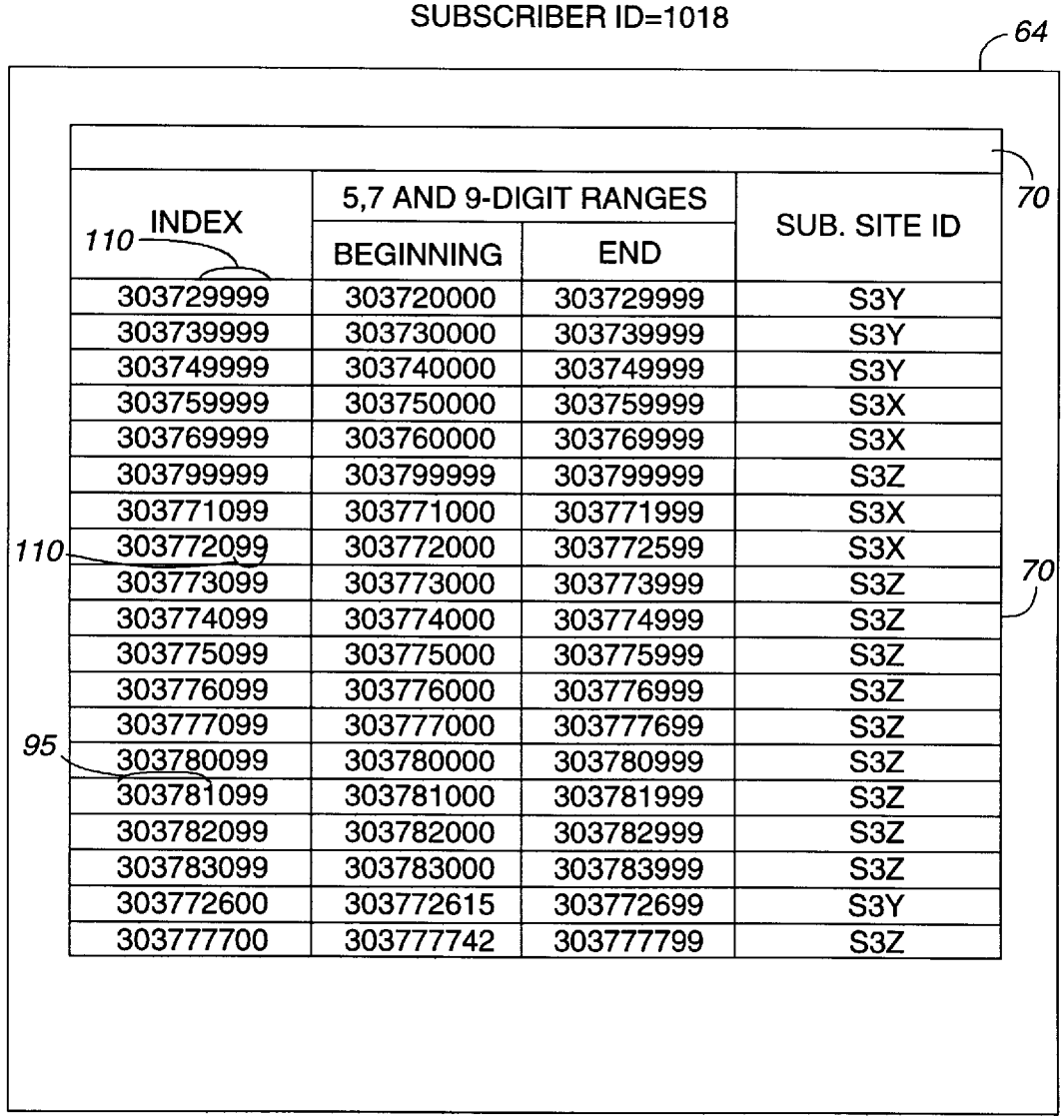
FIG. 12 shows another embodiment of a single call routing table corresponding to ranges used for the call routing assignments represented in FIG. 9A.

Referring to FIG. 12, as noted in connection with FIG. 10, it is desirable to have a single table that will allow storage of the different ranges for the multiple zip code lengths. Table 11 is a single table that contains the 5-digit zip codes ranges along with the 7-digit zip code ranges and the 9-digit zip code ranges. In the table shown in FIG. 12, stub numbers 110 are added to make the zip code indices the same length. In the table shown in FIG. 12, the stubs 110 are shown as 9999 for the 5-digit zip code indices and the stub is shown as 99 for the 7-digit range zip code indices. Note that the indices for the 9-digit zip code ranges do not contain stub values because the length of the 9-digit indices is the length that the other indices are extended to equal. As noted above, 00 to 49 may be used as sequence numbers and, therefore, the stubs 9999 used for the 5-digit zip code ranges and the stub 99 used for the 7-digit zip code ranges generate unique indices. The indices may then be used as keys into a hash/binary table for searching to retrieve appropriate data as known by those skilled in the art.

The range assignments to subscriber locations of FIG. 12 correspond to the range assignments discussed in connection with FIG. 9B. As illustrated, "0000" and "00" are appended to the beginning range value and "9999" and "99" are appended to the ending range value of the 5-digit and 7-digit zip code ranges respectively. By appending these values, the beginning range value and the end range value are all 9-digits in length. Appending these values can help to simplify comparisons when using service logic language (SLL) with the AT&T platform.

It should be appreciated by those skilled in the art that the range methods and techniques discussed herein can be extended to other codes such as telephone numbers, etc., or combinations of codes. Whenever there is a need to associate a set of geographic codes with one destination, the range storage and access methods herein are useful. For example, in a nationwide service center scenario, a range of NPA-NXXs can be associated with a service representative closer geographically to the callers, and the callers from those NPA-NXXs can then be routed to the telephone number associated with that specific representative.

Figure 13:
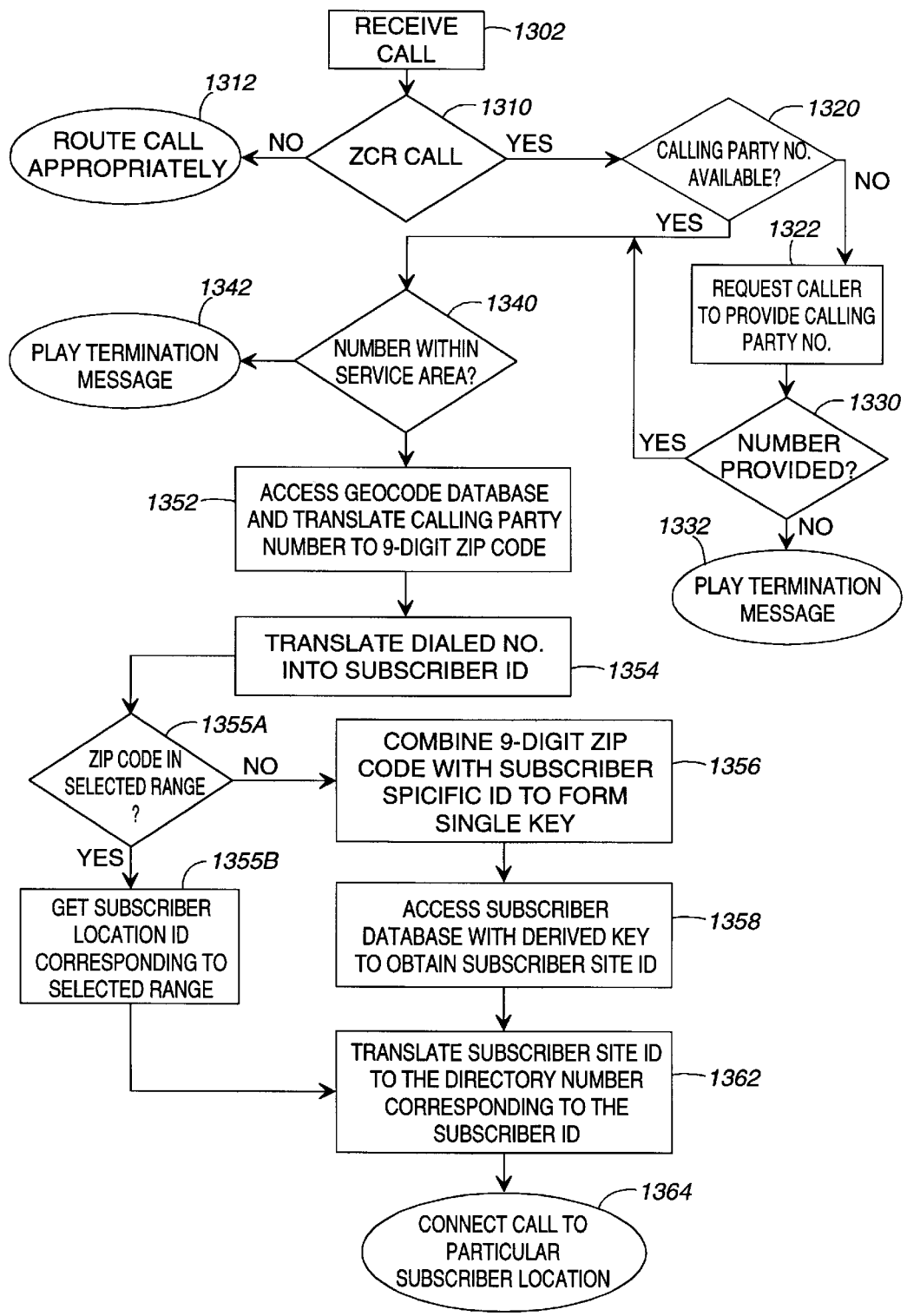
FIG. 13 is flow diagram of the steps implemented in another embodiment of the present invention.

Referring to FIG. 13, a flow diagram for implementing the computer-implemented process for routing calls using zip code ranges based upon the geographic location of a caller is shown. The computer-implemented process for routing a call to the appropriate subscriber will be described in connection with FIG. 13. At step 1302, the SCP 46 receives a call from a calling party. At step 1310, a determination is made as to whether the call is a zip code routing call or another call that requires special processing. If the call is not a zip code routing call, then at step 1312 the call is routed according to the service needed. If, at step 1310, the dedicated NXX indicates that the call is a zip code routing call, then the process proceeds to step 1320. At step 1320, a determination is made as to whether the calling party number is available. If the calling party number is not available, then at step 1322 the caller is requested to enter the ten-digit calling party number. A determination is made as to whether a ten-digit calling party number was entered at step 1330. If, at step 1330, the ten-digit calling party number was not entered, then the termination message is played at step 1332. However, if at step 1330, the ten-digit calling party number was entered then the process proceeds to step 1340.

Also, if at step 1320, the calling party number was available, then the process proceeds to step 1340. At step 1340, a determination is made as to whether the calling party number falls within the subscriber's area of service (i.e., LATA). If the calling party number does not fall within the subscriber's area of service, then a termination message is played at step 1342. If, at step 1340, the calling party number was determined to fall within the subscriber's area of service, then the process proceeds to step 1352. At step 1352, the geocode database is accessed with the calling party number and then the calling party number is translated into a nine-digit zip code. At step 1354, the dialed number is translated into a subscriber ID. The process then proceeds to step 1355A where the disclosed embodiment determines whether the zip code is within a zip code range of the range tables. If the zip code is within a range of the table, at step 1355B the subscriber location ID corresponding to the selected range is retrieved. The process then proceeds to step 1362 where the subscriber location ID is translated into a directory number corresponding to the subscriber location ID.

If at step 1355A, the retrieved zip code is not within a selected range then the process proceeds to step 1056. At step 1356, the subscriber ID is concatenated with the nine-digit zip code to form a subscriber database key 65. The process then proceeds to step 1358. At step 1358, the subscriber database is accessed with the derived subscriber database key 65 in order to translate the subscriber database key 65 to a subscriber site ID. At step 1362, the service package application is accessed with the subscriber site ID and the subscriber site ID is translated into a directory number corresponding to the appropriate subscriber location for receiving the call. At step 1364, the calling party is connected to the subscriber location identified in step 1362.

The foregoing relates to the preferred embodiment of the present invention, and many changes may be made therein without departing from the scope of the invention as defined by the following claims.

We claim:

1. A method of routing a call from a calling party to a particular subscriber location of a plurality of subscriber locations based in part on the geographic location of the calling party, said call being placed by dialing a single telephone number that is operative for serving all of said subscriber locations, comprising the steps of:

identifying the calling party with a specific location identifier indicating the location of the calling party;

said specific location identifier determined by searching a real time database with the number of the calling party;

providing a range table of selected ranges of location identifiers, each range corresponding to a call destination location of said subscriber; and if said specific location identifier is located in one of said selected ranges of said range table, routing said call to the destination location corresponding to said one of said selected ranges containing said specific location identifier.

2. The method of claim 1 wherein each selected range has a beginning and end location identifier.

3. The method of claim 1 wherein said location identifiers are zip code areas.

4. The method of claim 1 wherein said beginning and end location identifiers of a first range represent a different category of location identifiers from the beginning and end location identifiers of a second range.

5. The method of claim 4 wherein the category of the beginning and end location identifiers of the selected ranges are 5-digit zip codes, 7-digit zip codes, or 9-digit zip codes.

6. The method of claim 1 further comprising the steps of providing an auxiliary database of location identifiers corresponding to call destination locations, and if said specific location identifier is not located within one of said selected ranges of said range table, routing said call to the destination location corresponding to the specific location identifier located in said auxiliary database.

7. The method of claim 1 further comprising the step of facilitating searches through said ranges with index values corresponding to each range.

8. The method of claim 7 wherein said index values contain code values to uniquely identify each corresponding range.

9. The method of claim 8 wherein said index values further comprise range identifiers corresponding to selected digits of the location identifier of said selected ranges.

10. The method of claim 8 wherein said code values of said index values are sequential values.

11. The method of claim 8 wherein at least one of said index values comprises a first length and at least one of said index values comprises a second length.

12. The method of claim 11 wherein said code values of said index values of successive ranges are sequential values.

13. The method of claim 2 wherein selected digits are appended to said location identifiers to make said location identifiers equal in length.

14. A method of routing a call from a calling party to a particular subscriber location of a plurality of subscriber locations based in part on the geographic location of the calling party, said call being placed by dialing a single telephone number that is operative for serving all of said subscriber locations, comprising the steps of:

providing a first database for storing information associating calling party numbers with geographic codes, said geographic codes representing predetermined geographic areas;

providing a subscriber database for storing subscriber specific call routing information associated with said geographic codes;

in response to receipt of a call to said single telephone number, translating the calling party number into a specific geographic code by reference to said first database;

providing a range table of selected ranges of geographic codes, each selected range having a beginning and an end geographic code and each range corresponding to a call destination location of said subscriber;

if said specific geographic code is located in one of said selected ranges of said range table, routing said call to the destination location corresponding to the selected range containing said specific geographic code;

if said geographic code is not located in one of said selected ranges, creating a subscriber database key operative to identify the subscriber and said geographic code;

accessing said subscriber database with said key to obtain subscriber specific call routing information; and routing said call in accordance with the routing information obtained from said subscriber database.

15. The method of claim 14 wherein said geographic code represents the areas from which said call originated.

16. The method of claim 15 wherein said step of accessing said subscriber database to obtain subscriber specific call routing information comprises obtaining a subscriber site identification number.

17. The method of claim 16 further comprising translating said subscriber site identification number into a subscriber location telephone number and including said subscriber location telephone number in said call routing information.

18. The method of claim 14 wherein said step of creating said subscriber database key comprises combining a number representative of said subscriber, corresponding to said single number, with said specific geographic code to form said subscriber database key.

19. The method of claim 18 wherein said geographic code represents a zip code.

20. The method of claim 19 wherein said zip code represents a nine digit zip code.

21. A method of routing a call from a calling party to a specific call destination site based in part on the geographic location of the calling party, comprising the steps of:

providing a first database for storing information associating calling party numbers with geographic codes, said geographic codes representing predetermined geographic areas;

providing a subscriber database for storing call routing information associated with multiple subscribers;

providing a call control unit for controlling access to said first database and said subscriber database and said call control unit for storing certain call routing information;

in response to receipt of a call data packet containing the calling party number and the dialed number, at said call control unit, accessing said first database with said calling party number;

in response to receipt of said calling party number, at said first database, translating said calling party number to a geographic code and transmitting said geographic code to said call control unit;

providing a range table corresponding to said dialed number, at said control unit, of selected ranges of geographic codes, each selected range having a beginning and an end geographic code and each range corresponding to a call destination location of said subscriber;

if said specific location identifier is located in one of said selected ranges of said range table, routing said call to the destination location corresponding to selected range containing said specific geographic code;

if said geographic code is not located within one of said selected ranges, creating an access key for accessing said subscriber database, said access key operable to identify a specific call destination site from among a plurality of call destination sites of a plurality of parties and providing an indication of said specific call destination site to said call control unit;

accessing said subscriber database to obtain said indication of said specific call destination site; and routing said call to said specific call destination site.

22. The method of claim 21 wherein said geographic code represents a zip code.

23. The method of claim 22 wherein said zip code area represents a nine digit zip code.

24. A system of routing a call from a calling party particular subscriber location of a plurality of subscriber locations based in part on the geographic location of the calling party, comprising:

a first database for storing information associating calling party numbers with geographic codes, said geographic codes representing predetermined geographic areas;

a subscriber database for storing subscriber specific call routing information associated with said geographic codes;

a call control unit for accessing said first database to translate the calling party number into a specific geographic code;

said call control unit for providing call routing information if said specific geographic code is located in a range of a range table of selected ranges of geographic codes, each selected range having a beginning and an end geographic code and each range corresponding to subscriber specific call routing information; and said call control unit for providing a call routing number if said geographic code is not located within one of said selected ranges, by accessing said subscriber database to obtain subscriber specific call routing information.

* * * * *